(12) United States Patent
Pattison et al.

(10) Patent No.: US 7,805,532 B2
(45) Date of Patent: Sep. 28, 2010

(54) PLATFORM FOR INTEROPERABILITY

(75) Inventors: Ian McLean Pattison, Edinburgh (GB);
Roland Zink, Neu-Anspach (DE);
Michael Edward Smith Luna,
Snohomish, WA (US); Hanni Doch,
Woodbridge (CA)

(73) Assignee: 724 Software Solutions, Inc., Santa Barbara, CA (US)

( * ) Notice: Subject to any disclaimer, the term of this patent is extended or adjusted under 35 U.S.C. 154(b) by 95 days.

(21) Appl. No.: 11/796,707

(22) Filed: Apr. 27, 2007

(65) Prior Publication Data

US 2008/0263137 A1 Oct. 23, 2008

Related U.S. Application Data

(60) Provisional application No. 60/746,037, filed on Apr. 29, 2006.

(51) Int. Cl.
*G06F 15/16* (2006.01)

(52) U.S. Cl. ........................ 709/230; 709/203; 709/218; 709/238

(58) Field of Classification Search ................ 709/202, 709/203, 204, 231, 232, 234, 236, 246, 230
See application file for complete search history.

(56) References Cited

U.S. PATENT DOCUMENTS

| 3,798,817 | A | | 3/1974 | Zanoni |
| 4,941,170 | A | | 7/1990 | Herbst |
| 5,826,017 | A | * | 10/1998 | Holzmann ................. 709/230 |
| 5,991,812 | A | * | 11/1999 | Srinivasan ................. 709/232 |
| 6,085,236 | A | * | 7/2000 | Lea ........................... 709/220 |
| 6,173,327 | B1 | | 1/2001 | DeBorst et al. |
| 6,199,099 | B1 | | 3/2001 | Gershman et al. |
| 6,336,135 | B1 | | 1/2002 | Niblett et al. |
| 6,343,313 | B1 | * | 1/2002 | Salesky et al. .............. 709/204 |
| 6,640,248 | B1 | * | 10/2003 | Jorgensen ................... 709/226 |
| 6,757,365 | B1 | | 6/2004 | Bogard |
| 6,785,730 | B1 | * | 8/2004 | Taylor ........................ 709/230 |
| 6,792,431 | B2 | | 9/2004 | Tamboli et al. |
| 6,823,373 | B1 | * | 11/2004 | Pancha et al. ............... 709/219 |

(Continued)

FOREIGN PATENT DOCUMENTS

WO  WO 2007127422 A2  11/2007

(Continued)

OTHER PUBLICATIONS

PCT/US2007/010325, International Search Report and Written Opinion mailed Jun. 10, 2008 (11 pages).

(Continued)

*Primary Examiner*—Michael Won
(74) *Attorney, Agent, or Firm*—Sprinkle IP Law Group

(57) ABSTRACT

Systems and methods for interoperability are disclosed which allow for a user of one network to communicate seamlessly with a user of another network. In accordance with one embodiment of the present invention, a network bridge is provided. The network bridge may comprise a number of gateways and adapters for handling multiple protocols. In one embodiment an application bridge comprising an application server may be used to service communications while a billing bridge may be provided to control and charge network subscribers. Users are provided seamless access to data services in different networks without having to subscribe to those networks.

20 Claims, 28 Drawing Sheets

U.S. PATENT DOCUMENTS

| | | | |
|---|---|---|---|
| 6,912,389 B2 | 6/2005 | Bright et al. | |
| 6,957,077 B2 | 10/2005 | Dehlin | |
| 7,165,035 B2* | 1/2007 | Zinser et al. | 704/500 |
| 7,181,538 B2* | 2/2007 | Tam et al. | 709/246 |
| 7,185,049 B1* | 2/2007 | Benitez et al. | 709/203 |
| 7,215,643 B2 | 5/2007 | Mussman et al. | |
| 7,266,611 B2* | 9/2007 | Jabri et al. | 709/231 |
| 7,295,608 B2* | 11/2007 | Reynolds et al. | 375/240.01 |
| 7,328,042 B2* | 2/2008 | Choksi | 455/552.1 |
| 7,509,431 B2* | 3/2009 | Singhal et al. | 709/230 |
| 7,548,987 B2* | 6/2009 | Jabri et al. | 709/231 |
| 7,650,415 B1* | 1/2010 | Peterson | 709/227 |
| 2002/0007398 A1 | 1/2002 | Mendiola et al. | |
| 2002/0065935 A1* | 5/2002 | Koperda et al. | 709/238 |
| 2002/0122547 A1 | 9/2002 | Hinchey | |
| 2002/0155826 A1 | 10/2002 | Robinson et al. | |
| 2002/0186723 A1 | 12/2002 | Sprague et al. | |
| 2003/0016639 A1 | 1/2003 | Kransmo et al. | |
| 2003/0087632 A1 | 5/2003 | Sagi et al. | |
| 2003/0224814 A1 | 12/2003 | Qu et al. | |
| 2004/0032881 A1 | 2/2004 | Arai | |
| 2004/0093202 A1* | 5/2004 | Fischer et al. | 704/216 |
| 2004/0152477 A1 | 8/2004 | Wu et al. | |
| 2005/0009541 A1 | 1/2005 | Ye et al. | |
| 2005/0044144 A1 | 2/2005 | Malik et al. | |
| 2005/0108328 A1* | 5/2005 | Berkeland et al. | 709/204 |
| 2005/0114533 A1 | 5/2005 | Hullfish et al. | |
| 2005/0143136 A1 | 6/2005 | Lev et al. | |
| 2005/0165913 A1 | 7/2005 | Coulombe et al. | |
| 2005/0197108 A1* | 9/2005 | Salvatore et al. | 455/414.3 |
| 2005/0271059 A1 | 12/2005 | Young et al. | |
| 2006/0053227 A1* | 3/2006 | Ye et al. | 709/230 |
| 2007/0016390 A1 | 1/2007 | Bernardo et al. | |
| 2007/0076857 A1 | 4/2007 | Chava et al. | |
| 2008/0147864 A1* | 6/2008 | Drogo De Iacovo et al. | 709/226 |
| 2008/0182548 A1 | 7/2008 | Pattison et al. | |
| 2009/0049202 A1 | 2/2009 | Pattison et al. | |

FOREIGN PATENT DOCUMENTS

| | | |
|---|---|---|
| WO | WO 2007130312 A2 | 11/2007 |
| WO | WO 2009061677 A1 | 5/2009 |

OTHER PUBLICATIONS

International Search Report and Written Opinion for PCT/US08/82062, mailed Jan. 9, 2009, 8 pgs.

International Preliminary Report on Patentability, PCT/US07/010325, mailed Nov. 13, 2008, 7 pgs.

Office Action issued in U.S. Appl. No. 11/796,572 mailed Nov. 14, 2008, 7 pgs.

International Search Report and Written Opinion, PCT/US2007/010327, mailed Nov. 24, 2008, 10 pgs.

International Preliminary Report on Patentability, PCT/US2007/010325, mailed Nov. 13, 2008, 7 pgs.

Office Action issued in U.S. Appl. No. 11/796,572 mailed May 14, 2009, 7 pgs.

Office Action issued in U.S. Appl. No. 11/937,695 mailed Sep. 9, 2009, 15 pgs.

Office Action issued in U.S. Appl. No. 11/796,572 mailed Mar. 8, 2010, 9 pgs.

Office Action issued in U.S. Appl. No. 11/937,695 mailed Mar. 11, 2010, 19 pgs.

* cited by examiner

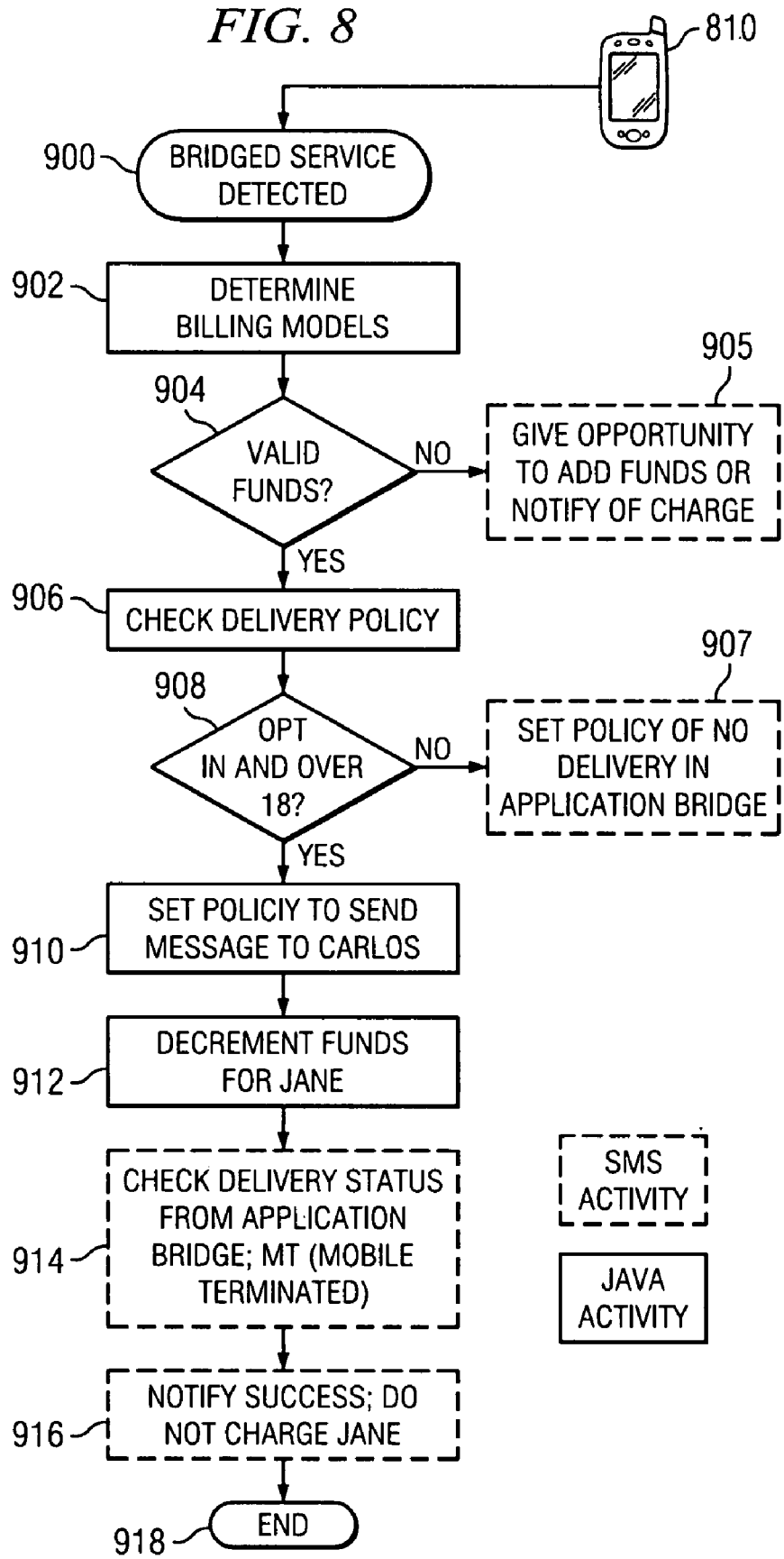

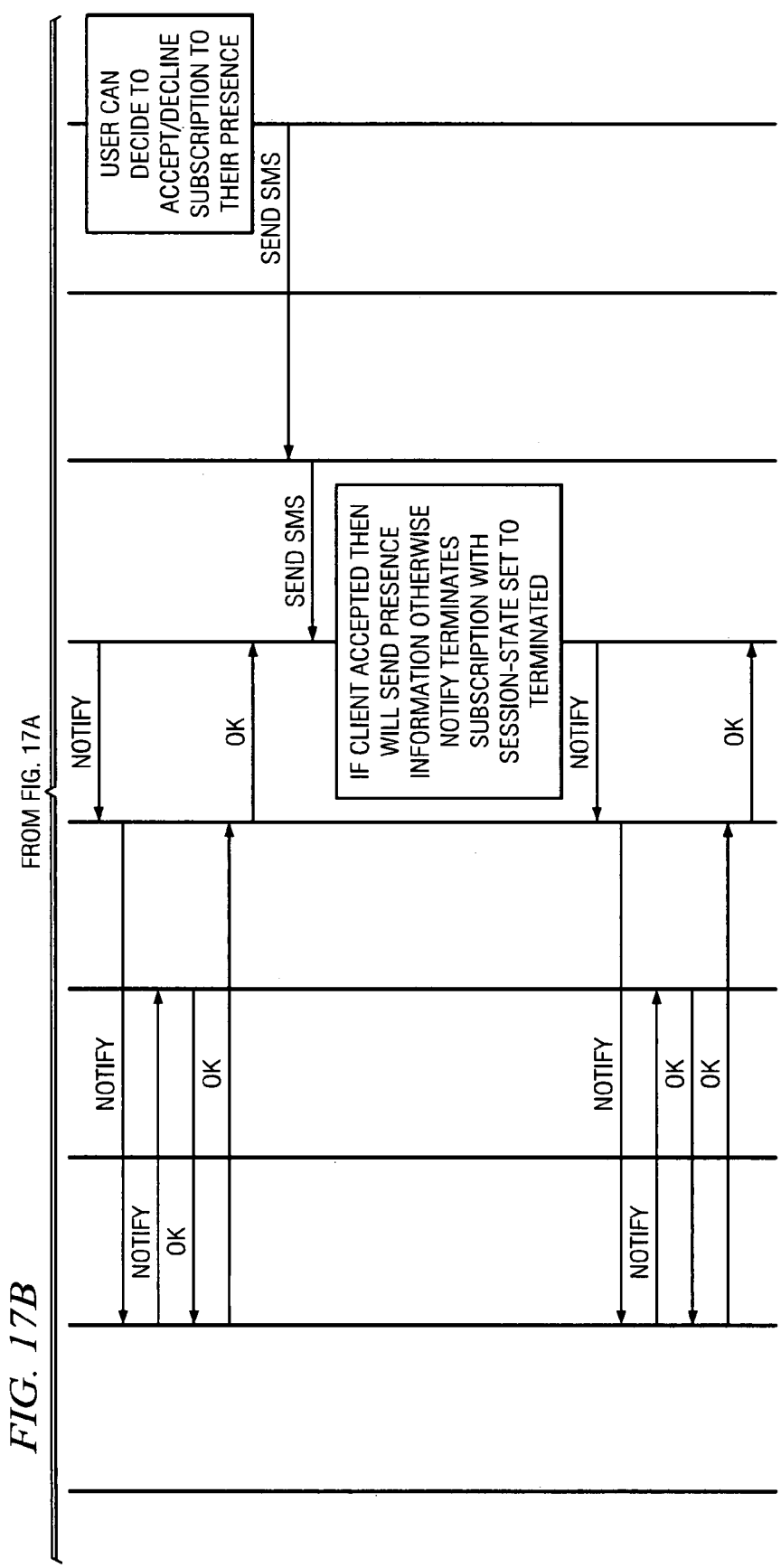

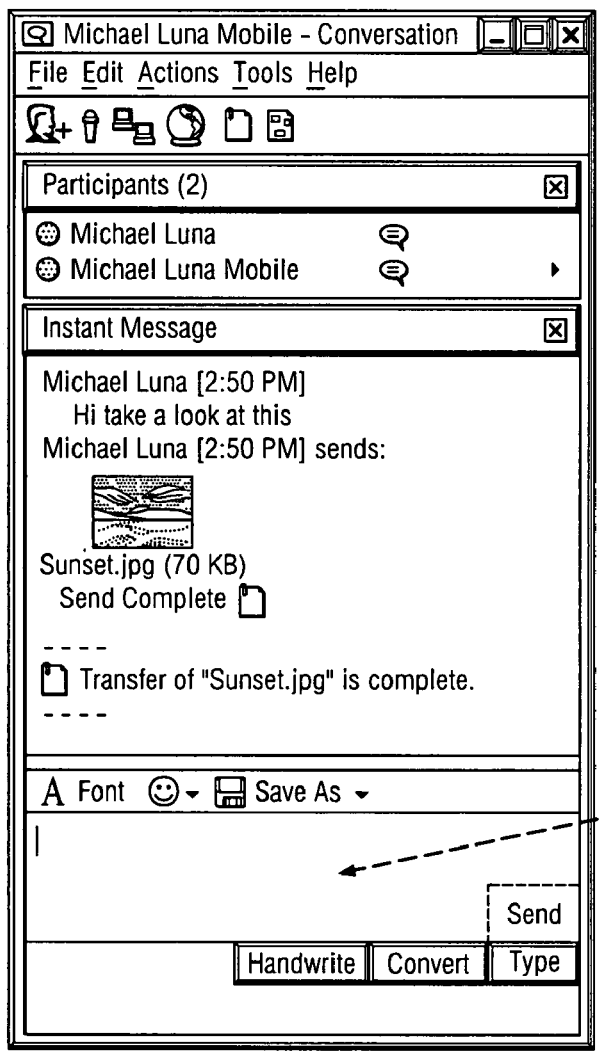
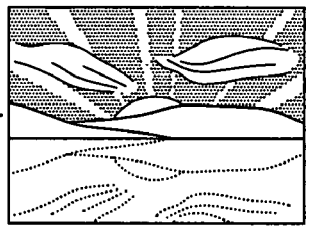
*FIG. 18D*
DRAG AND DROP IMAGE INTO THE IM WINDOW
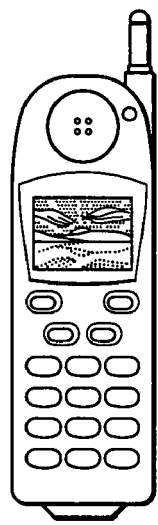
THE IMV/
FORMA
PHONE AS MMS MESSAGE
*FIG. 18E*

PLATFORM FOR INTEROPERABILITY

RELATED APPLICATIONS

This application claims priority to U.S. Provisional Patent Application Ser. No. 60/746,037, by Ian Pattison, et al., entitled "Platform for Interoperability" filed on Apr. 29, 2006, the entire contents of which are hereby expressly incorporated by reference for all purposes.

FIELD OF THE INVENTION

The present invention is generally related to the field of telecommunications, and more particularly, to systems and methods for interoperability between or among disparate networks such as legacy networks or next generation networks.

BACKGROUND OF THE INVENTION

A number of different types of telecommunication networks and telecommunication protocols currently exist. For example, mobile networks use protocols that allow mobile device users to move from one location to another. Examples of mobile devices include, without limitation, mobile phones, personal digital assistants (PDAs), and laptops, etc.

Fixed networks provide data services in a fixed environment. An example of a fixed network is a DSL (digital subscriber line) network. A fixed network may be fixed wireless or fixed wireline. Fixed wireless is an alternative to fixed wireline, e.g., landline, coaxial cable, and copper connections. Fixed wireless refers to the operation of wireless devices or systems in fixed locations such as homes and offices. An example of fixed wireless is broadband wireless access in a home.

In addition, a number of different types of data services and different methods of communicating between or among devices currently exist. For example, Short Message Service (SMS) is a service for sending text messages to mobile phones and other devices.

As another example, Multimedia Messaging Service (MMS) is a communications technology that allows users to exchange multimedia messages and content between MMS-capable mobile phones and other MMS-capable devices. MMS requires users to have the same or compatible clients on both ends (or complex translation infrastructure).

Wireless Application Protocol (WAP) is a specification for a set of communication protocols to standardize the way that wireless devices, such as cellular telephones and radio transceivers, can be used for Internet access, including e-mail, the World Wide Web, newsgroups, and instant messaging, etc. WAP-based services require special browsers or infrastructure to access services. While Internet access has been possible in the past, different manufacturers have used different technologies.

IP Multimedia Subsystem (IMS) is defined by Third Generation Partnership Project (3GPP) as an architecture for multimedia sessions over IP. IMS and other advanced IP-based services such as Voice over IP (VoIP), which rely on new network topologies and new clients for access, may be considered separate networks as their architecture may fail to consider interoperability, a subscriber's identity, target client, or services beyond basic voice services.

Many other types of data services and methods of communicating exist, such as creating separate networks for IMS or other advanced services which also result in creating isolated services and islands of communities. This situation poses a barrier to interoperability.

Additionally, within these various mobile and fixed networks, there are multiple channels via which users can originate and/or receive messages or other forms of communication. In many cases, a single subscriber may have multiple identities, including different identities for phone-based services, such as voice and SMS or MMS, as well as identities for other communication channels such as instant messaging and e-mail.

SUMMARY OF THE INVENTION

Access to existing infrastructure and existing clients has been limited as specialized nodes are usually used for interworking and special provisioning usually must be made to enable access or inter-communication with existing subscribers. When new access methods and services are introduced, they are generally implemented in mobile and fixed wireless networks as discrete, end-to-end services which rely on specific clients or network technology to enable access. This typically limits the addressable subscriber population to only those with compatible technology. SMS, for example, has SMS clients communicating across SMS servers in the network. MMS servers use similar structure—MMS clients communicate via MMS servers on a network to other MMS clients. However, these may be two distinct networks. Thus, if an MMS message, even an MMS message containing only text content, is sent to an SMS enabled device, the message will not be delivered.

Enabling users of differing technology to communicate typically involves limited or complex methods and is usually accomplished by the introduction of functionality tailored specifically to the types of technologies or protocols which it is desired to bridge. For example, an MMS to email communication is possible, but this is accomplished by instituting some specific piece of functionality into the MMS infrastructure which accomplish this MMS to email communication (and which may not even accomplish an email to MMS communication).

These difficulties have created problems with up-take and adoption of new technologies (e.g. next generation networks or protocols) by forcing users to update clients and services to maintain connectivity with others in their community. It also increases the time to pay-back investment in the installation or use of such new services and network infrastructures.

As can be seen in the above-described cases, interoperability between existing services and/or existing clients is approached on a service-by-service basis. This approach results in closed environments where the vendor providing a solution for new services or new clients defines the level of interoperability with existing services and/or clients, resulting in inconsistent and proprietary solutions. It also results in additional costs as there is not a consistent platform for providing interoperability between disparate services and or clients.

In addition, a limitation of existing technology is that in most cases, either the originator of a message must use the correct identity of the recipient for the channel via which the message is to be delivered, or there is a fixed mapping for a target address for a given service, which may be supported by, for example, DNS Enum, to convert a MSISDN (Mobile Subscriber ISDN Number) to a mail address to allow MMS to e-mail routing. As a result of this limitation, there is no capability to take into account a subscriber's current environment in deciding which of a user's identities should be used for expressing the originator's or recipient's identity. This is especially a limitation in environments which attempt to bridge from one communication channel to another.

Since new network technologies often introduce new ways of identifying or routing messages to a subscriber, the problem of identity management across network types arises. The industry is addressing this with the concept of a single identity, but the problem is better solved not with a single identity, but rather, by selecting the right identity for the subscriber based for example, on the network and type of device he or she is using at a given time.

As there are new data transport protocols and entire stacks introduced which manage the authentication, billing, and routing of messages in new networks. It would be desirable for these protocols to be seamlessly bridged between newer (e.g. next generation) networks or existing networks and legacy networks in a way that preserves both access management and billing services, as well as protocol transformation (which can be accomplished today with simple proxies and gateways).

Usually, each new service introduced is associated with a means to bill, provision, or track usages of a service (e.g., to enable business logic associated with the services). When considering inter-network interoperability, it would be desirable to provide a means to extend the business logic to subscribers that may be accessing the service from outside the network of origin.

This desire has driven the need for improved systems and methods for communication that overcome the deficiencies in the prior art. In accordance with one embodiment of the present invention, a platform is provided that leverages existing standards to seamlessly connect next-generation networks to legacy networks without complex subscriber or network-based provisioning. More specifically, a legacy network (e.g. an existing network) and its subscribers appear as a seamless extension to the new networks. An emulated interface as provided by embodiments of the present invention advantageously allows interoperability between new technology and existing technology without any specialized or proprietary support in the new technology domain. By providing an emulated interface between the networks and services, provisioning, management, and integration costs are advantageously reduced. Moreover, adoption of new technology is increased as a result of greater interoperability.

In accordance with one embodiment of the present invention, a method for interoperability is provided. A request is received from a user of a first network which communicates according to a first communication protocol. The request is normalized into a network-independent format. A billing policy may be determined. A channel of communication is selected. An identity is selected from a plurality of identities of a recipient user of a second network which communicates according to a second communication protocol. A request is generated for the second communication protocol and sent to the second network.

In accordance with another embodiment of the present invention, a system for network interoperability comprises a network bridge configured to translate and route data between a first network and a second network. The first network communicates according to a first communication protocol, and the second network communicates according to a second communication protocol. An application bridge is communicably coupled to the network bridge. The application bridge is configured to receive and respond to requests for content and services. A billing bridge may be provided, which is communicably coupled to the network bridge, and is configured to control access to content and services.

Embodiments of the present invention described herein may be implemented by software or hardware or both. For example, a machine-readable medium having stored thereon a plurality of executable instructions for implementing the methods of the present invention may be provided. The executable instructions may be stored as software code components or modules on one or more computer readable media (e.g., non-volatile memories, volatile memories, DASD arrays, magnetic tapes, floppy diskettes, hard drives, optical storage devices, or any other appropriate computer-readable medium or storage device). In one exemplary embodiment of the invention, the executable instructions may include lines of compiled C++, Java, HTML, or any other programming or scripting code.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements

BRIEF DESCRIPTION OF THE DRAWINGS

Embodiments of the inventive aspects of this disclosure will be best understood with reference to the following detailed description, when read in conjunction with the accompanying drawings, in which:

FIG. 8 depicts a process flow diagram of an exemplary method for billing management in connection with the exemplary implementation of FIG. 7;

FIGS. 18A, 18B, 18C, 18D, and 18E depict exemplary embodiments of user interfaces for providing seamless interoperability between an instant messaging environment and a PoC environment with multimedia and video.

DETAILED DESCRIPTION

The invention and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

Figure 1:
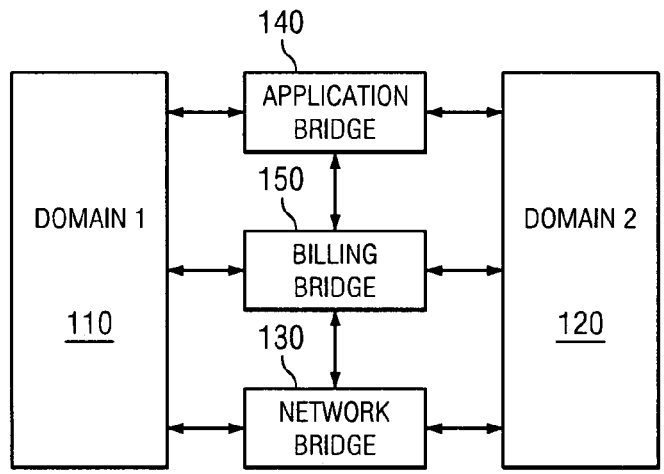
FIG. 1 depicts a block diagram of an exemplary platform for interoperability in accordance with one embodiment of the present invention.

Reference is now made to FIG. 1, which depicts a block diagram of an exemplary platform for interoperability in accordance with one embodiment of the present invention. In one embodiment, a seamless connection is provided between a first domain 110 and a second domain 120 without complex subscriber or network-based provisioning in either domain. For example, there is no need to provision non-IMS subscribers within an IMS domain. The first domain 110 may comprise, for example, a next-generation network such as IMS, SIP (Session Initiation Protocol), an IP based network, or another type of network, and the second domain 120 may comprise, for example, an existing legacy network, such as a circuit switched network. While two domains are depicted in FIG. 1 for ease of illustration, it should be understood that various other domains or various other types may also be included.

In accordance with one embodiment of the present invention, a network bridge 130, an application bridge 140 and a billing bridge 150 may be provided. Network bridge 130 may emulate the access interfaces (at the access layer) of the new network and the existing legacy network. Application bridge 140 provides a suite of applications and services that can be delivered to subscribers in both new and existing domains. Billing bridge 150 may also be provided to control and charge for access to value-added or premium services or content by users (e.g. subscribers or partners) of access channels. The aforementioned components may be deployed between the two domains, as depicted in FIG. 1, or, alternatively, they may be deployed in one or both domains 110, 120 or in conjunction with one or both domains 110, 120.

The network bridge 130 allows the security, access or service management mechanisms of domain 110 and those of domain 120 to coexist. For example, the network bridge 130 is responsible for the access protocols and translations required between access protocols in the domains 110, 120. The network bridge 130 supports multiple protocols including those utilized by domain 110, and those used by domain 120. In FIG. 1, the network bridge 130 may route requests from a first domain 110 to an appropriate server, such as application bridge 140, associated with the second domain 120 that provides the desired interoperability, and performs translations on requests or responses.

The application bridge 140 provides a suite of applications and services that can be delivered to subscribers in both domains 110, 120. The application bridge 140 supports the delivery and request of services via multiple channels. This allows the application bridge to appear as an application server in either or both of the domains 110 and 120. Indeed, in one embodiment, the application bridge enables inter domain interoperability of a service (e.g. between domains 110 and 120) by implementing the service in accordance with domain 110 and then making use of the capabilities of domain 120 to emulate the service to users within this domain.

A billing bridge 150 may also be provided. The billing bridge 150 may be implemented as software or hardware or both. The billing bridge 150 makes existing service management infrastructure, which may be used for controlling and charging for access to value added services and content, accessible to domains 110, 120 or networks associated with these domains 110, 120 via the appropriate interfaces. The billing bridge 150 controls and charges for access to value-added or premium services or content by subscribers or partners using a number of access channels.

The billing bridge 150 allows a MNO (mobile network operator) to reuse its existing investment in charging infrastructure for value-added services in conjunction with a new domain. Many MNOs have IP-based network infrastructure for managing and charging fees for access to premium content by both post-paid and prepaid subscribers and also managing relationships with a content provider (e.g., revenue sharing, reporting, etc.). The billing bridge 150 enables these types of infrastructures to be re-used for new services by providing a transparent bridge from new domains to the existing billing infrastructure.

Figure 2:
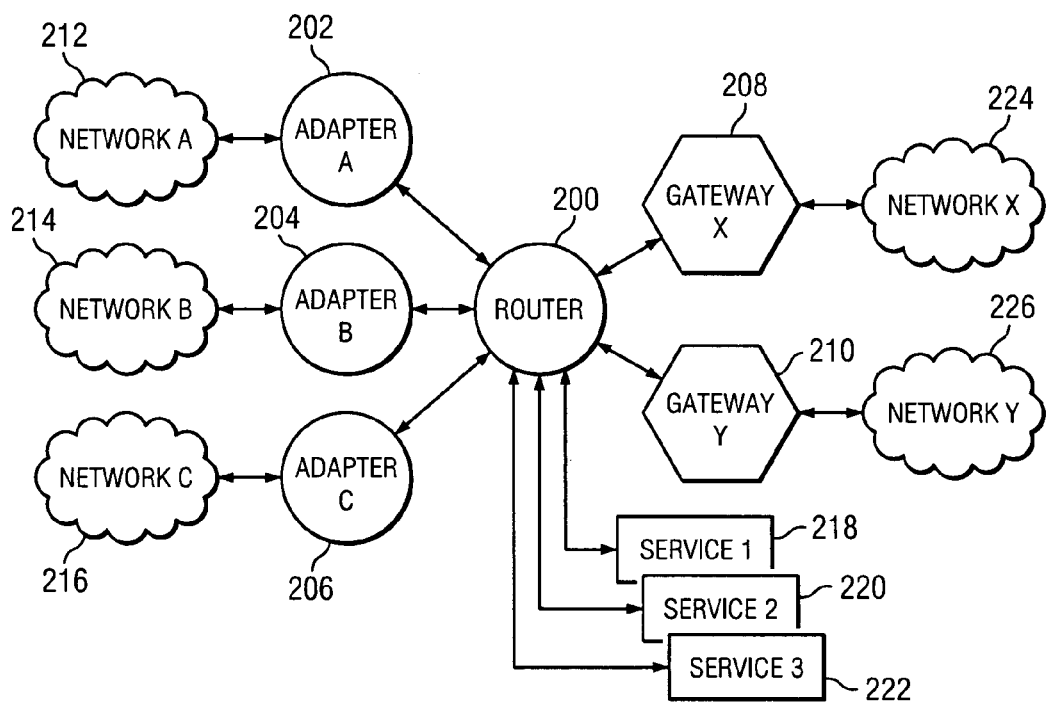
FIG. 2 depicts a block diagram of an exemplary network bridge in accordance with one embodiment of the present invention.

FIG. 2 depicts a block diagram of an exemplary implementation of one embodiment of network bridge 130. The network bridge 130 may be implemented as software or hardware or both.

In accordance with certain embodiments of the present invention, the network bridge 130 is provided with contextual identity mapping support. In such embodiments, the network bridge 130 is able to receive communication requests via one or more of a number of different incoming channels. Each of these channels uses identities corresponding or associated with the channel to identify the users involved in the communication (e.g., recipients, originators, etc.). The network bridge 130 is further able to originate communications via a number of different outgoing channels. When originating traffic on an outgoing channel, the identity of users corresponds or is associated with the outgoing channel. The outgoing channel may be different than the incoming channel via which communication was received and hence the identities may be different. The network bridge 130 is also able to route requests from one channel to another and to perform identity mapping such that identities corresponding to the respective channel are always used on both channels. U.S. patent application Ser. No. 11/795,572 entitled "Contextual Based Identity" by inventors Ian McLean Pattison, Michael Edward Luna and Roland Zink, filed Apr. 27, 2007 describes a method for providing contextual identity mapping support, and is incorporated by reference.

In one embodiment, the network bridge 130 comprises a message switch 200 coupled to input protocol handlers (e.g., adapters 202, 204, and 206) and output gateways 208 and 210 such that routing, adaptation or other processing can be applied to communications (i.e. messages, requests or the like). The adapters 202, 204, and 206 allow requests to be received from different types of networks 212, 214, and 216. Adapters 202, 204 and 206 implement the protocol, such as SIP or SMTP, that the originator of a communication (e.g. in a domain 110, 120) will expect to use to communicate with another user. Adapters 202, 204, and 206 receive communications from networks 212, 214, and 216, and normalize the communication. U.S. Pat. No. 6,173,327 issued to Jeroen De Borst et al describes one method for normalizing communications and is incorporated fully herein by reference. Examples of adapters 202, 204, and 206 include without limitation an I-CSCF (Interrogating Call Session Control Function) network adapter, a Wi-Fi® network adapter, etc. Advantageously, the use of normalized requests results in a generalized architecture such that when new domains are added, no new infrastructure is necessary, because only a new adapter is utilized to accommodate communications from that domain.

Examples of gateways 208 and 210 include without limitation a PSTN (Public Switched Telephone Network) gateway, a HTTP gateway, a SIP gateway, etc. The services 218, 220, and 222 may include services beyond standard subscriber services. Examples of such services include without limitation delivering premium content, throttling, metering, content filtering such as parental controls, virus checking, and many others. In some embodiments, services 218, 220 and 222 include some or all the functionality of billing bridge 150. Advantageously, because requests are normalized before they reach router 200, services 218, 220, and 222 can be applied independent of the originating domain or protocol.

By bridging the networks with a multi-protocol based message switch, advanced services can be deployed in a newly added network domain and used by subscribers in the newly added domain and any legacy domains. Additionally, services in any legacy domain can be accessed from the new domain via the network bridge as if they were services deployed in the new domain.

Network bridge 130 may also have access to user profile information. In some embodiments, when a request is received at network bridge 130, the present invention checks to see if an end user has access to the same network. For example, if a client sends an MMS message, router 200 may check to see if the intended recipient is using equipment that has MMS capability. If so, then network bridge 130 may provide the functionality to send the message to the end user directly.

Thus, during operation, one or more communications may be received from a network 212, 214, 216. These communications are normalized by the adapter 202, 204, 206 and passed through router 200. Depending on a wide variety of criteria such as those elaborated on above including the networks or protocols utilized by the source and destination of the communication, the contents of the communication, applications associated with the communication, etc. the router may route these communications to one or more services 218, 220, 222 which may be applied in conjunction with the communication (e.g. the service may be applied to the communication or based on the communication) at network bridge 130, billing bridge 150 or application bridge 140. Similarly, communications originating from one or more services 218, 220, 222 intended for one or more destinations on networks 224, 226 may be received at router 200 and these communications routed to the gateway 208, 210 corresponding to the network 224, 226 associated with the destination. An advantage of network bridge 130 is that it appears as a standard element of both domain 110 and 120. Advantageously no special elements are needed in domains 110 and 120 in order to enable the bridging of these two disparate domains.

As may be realized, the application of services may allow a wide variety of functionality to be accomplished in conjunction with the reception of one or more communications. For example, a communication may be received and a service applied to translate this communication from one protocol to a different protocol corresponding to a destination for the communication. Similarly, at an application level a service may be applied to multiple communications, for example, multiple communications intended for a destination may be received and routed to a service which performs transcoding of content comprised by these communications to generate a new set of communications corresponding to the originally received set of communications. These new communications may then be routed to the destination, such that the user at the destination may receive communications tailored to the capabilities of his device where the manipulation of the original communication occurs unbeknownst to him.

Figure 3:
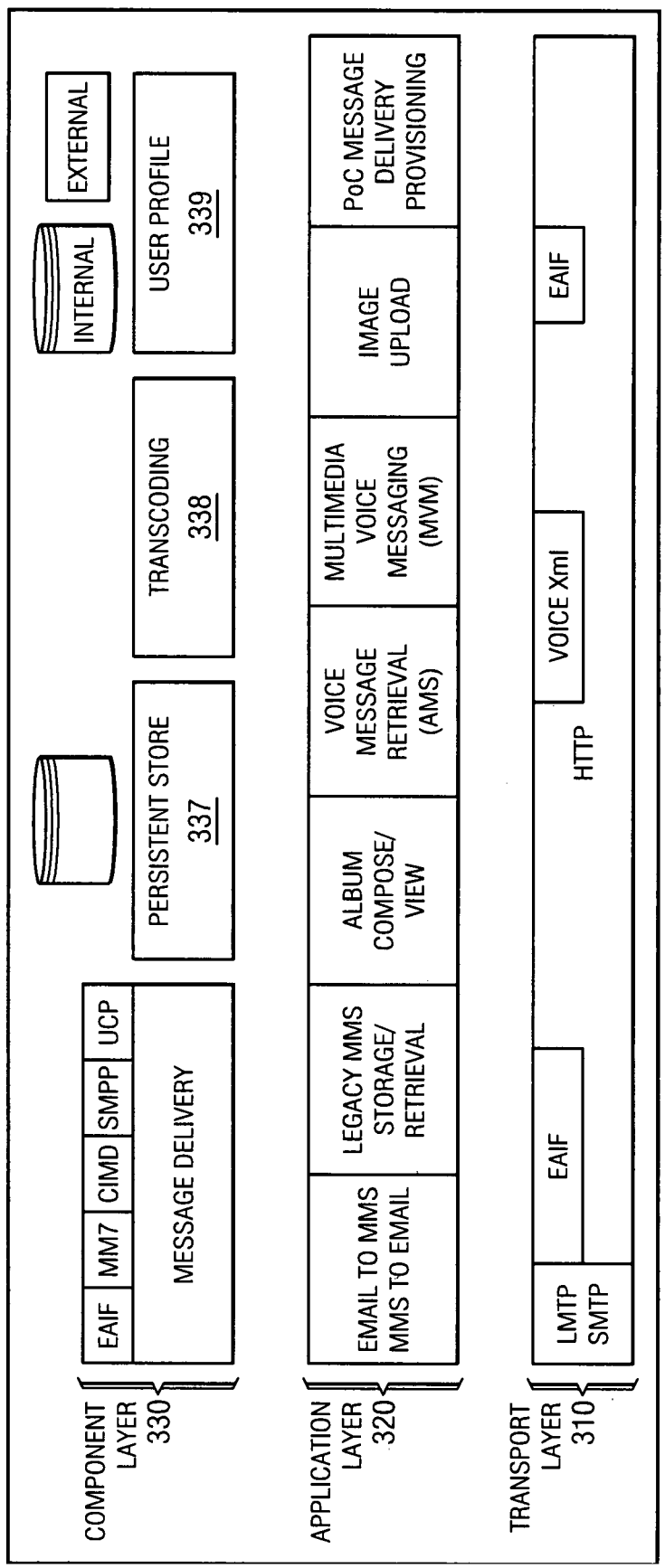
FIG. 3 depicts a block diagram of an exemplary architecture for an application bridge in accordance with one embodiment of the present invention.

In accordance with certain embodiments of the present invention, a layered architecture is provided for the application bridge 140, as depicted in FIG. 3. A transport layer 310 is provided which includes a number of protocol components (e.g. adapters or gateways) via which applications can receive requests, respond to these requests, or originate requests. For example, in one embodiment, transport layer 310 may support SIP (TCP/UDP), Hypertext Transfer Protocol HTTP (TCP) MM7 (HTTP/TCP), Simple Mail Transfer Protocol SMTP (TCP), and/or Local Mail Transfer Protocol LMTP (TCP/IP). The transport layer 310 is both modular and extensible for adding/modifying protocols as well as being independent of the application making use of the transport. In some embodiments, network bridge 130 may not be utilized, present, or may be redundant, as transport layer 310 contains substantially similar functionality.

Above the transport layer is an application layer 320, which comprises application logic that determines how communications should be presented to an end user. Multiple applications are supported within the application bridge 140, and these can make use of the transport and component layers to provide desired functionality. In one embodiment, for example, the application layer 320 may support applications including, but not limited to, converting email to MMS, and vice versa, storing and retrieving legacy MMS, composing and viewing albums, retrieving voice mails, multimedia voice messaging, uploading and downloading images, and enabling PoC talk bursts to be delivered via alternative mechanisms, such as MMS, to non-PoC devices.

Above the application layer 320 is a component layer 330, which provides a set of services to the application layer 320.

The set of components is extensible, and a few examples of components include a message delivery subsystem, a persistent store 337, a transcoding service, and a user profile repository. The message delivery subsystem may include, for example, EAIF (External Application Interface), MM7, CIMD (Computer Interface to Message Distribution), SMPP (Short Message Peer-to-Peer Protocol), and UCP (Universal Computer Protocol) components, etc. Persistence store 337 may store, for example, a picture, a complete multipart mail message, received communications, etc. In one embodiment, the message delivery component may make use of transport layer for actual protocol support.

The transcoding function allows the system to translate a data entity from one form to another. For example, transcoding function 338 may translate a .bmp file into a .jpeg file, or a .wav file into a 3gp file. The user profile function 339 contains information about the user, such as preferences, policies, and rules pertaining to the user.

As discussed above, application bridge 140 may implement one or more services. In conjunction with the implementation of these services application bridge 140 may receive one or more communications through router 200 (for example, when network bridge 130 is being used as a transport layer in conjunction with application bridge 140), where the communication is associated with a particular transport layer protocol or application. Based on a criteria associated with the destination of the communication (which may be obtained e.g. from user profile function 339), the service applied by application bridge 140 to the communication may generate a new set of communications based on applying application logic of application layer 320 to the communication or adapting the protocol of the communication using transport layer 310. It will be noted that in certain cases to apply the logic of application layer 140 to a communication it may be desired to assemble a group of affiliated communications and apply the logic of application layer 140 to the group of communication in order to form the new set of communications. For example, data associated with a certain application (such as an email) may be split over many individual communications (e.g. packets or the like). Thus, a single communication/interaction in domain 110 may result in multiple communications/interactions with domain 120, and vice versa. For example, receiving PoC talk burst from domain 10 may result in saving audio content in a persistent store, sending a SMS as a notification to 120, then accepting a call from device in 120 before playing the audio content, retrieved from persistent store, to device in 120.

Figure 4:
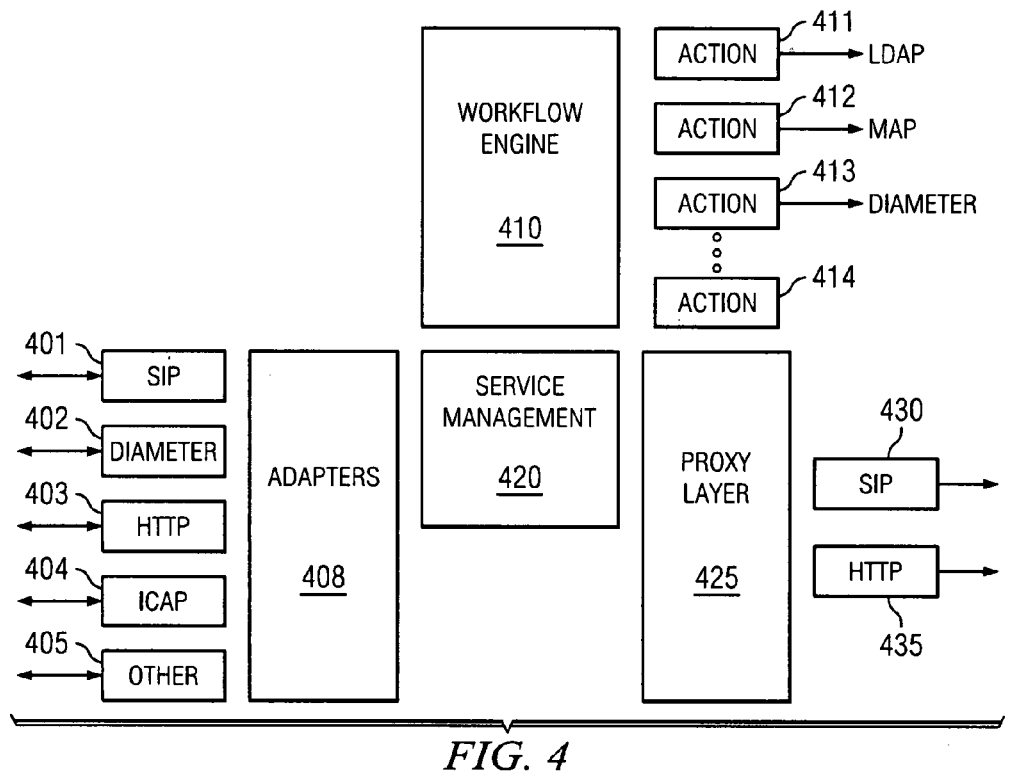
FIG. 4 depicts a block diagram of an exemplary billing bridge in accordance with one embodiment of the present invention.

Turning now to FIG. 4, one embodiment of an exemplary architecture for a billing bridge is depicted. The billing bridge 150 provides a means to extend the billing, monitoring, and provisioning services (e.g., the business logic) into a domain. This allows the service provider to manage costs and service provisioning associated with providing services to subscribers outside the normal service domain. More specifically, in one embodiment, billing bridge may implement one or more service where the application of the service may entail the invocation of one or more workflows. The billing bridge 150 may have an architecture which allows the addition of plug-in modules to enable service workflows to access external systems and perform the necessary actions required when intermediating access to a service or content. The billing bridge 150 has the ability to act in either agent mode (e.g., request/response) or as an intermediate proxy between a subscriber and content.

In the example shown in FIG. 4, the billing bridge 150 is accessible via a number of channels/protocols, including IMS Service Control ISC (SIP) 401 and Ro (Diameter) 402 for use from the IMS domain, plus ICAP (Internet Content Adapter Protocol) 403, HTTP 404, and other protocols from a domain. The billing bridge 150 has a flexible workflow engine 410 such that the MNO can define on a per service basis the charging and other policy actions desired.

The workflow engine 410 receives or otherwise obtains input parameters, which may be associated with a particular communication, and applies generalized business rules (i.e., application logic) found in workflow engine 410, which then generates actions to execute to determine how the communication should be billed. Workflow engine 410 may use an intermediation architecture that inspects a communication received by the network bridge to determine if the communication should be delivered to the end user. Advantageously, workflow engine 410 enables billing bridge 150 to perform single-environment bridging (SMS-SMS, MMS-MMS, SIP-SIP). For example, in some situations, workflow engine 410 determines that the incoming communication is a SIP protocol and the end user can receive a SIP message, so the communication is forwarded to the end user and workflow engine 410 only executes a billing action. Workflow engine 410 also enables billing bridge 150 to be deployed in conjunction with network bridge 130, for example billing bridge 150 may be used to implement a service 218, 220, 222.

More specifically, the parameters associated with the communication act as variables that are set for each service (e.g. workflow associated with a service). Based on the parameters and rules, decisions to take various actions may be reached. The actions may include, for example, actions implemented as HTTP activities, SMS activities, and Java activities, etc. A Java activity may be predefined or custom code. In one embodiment, all or part of billing bridge 150 may be implemented in conjunction with a service such as services 218, 220, and 222 in FIG. 2.

Figures 5A, 5C:
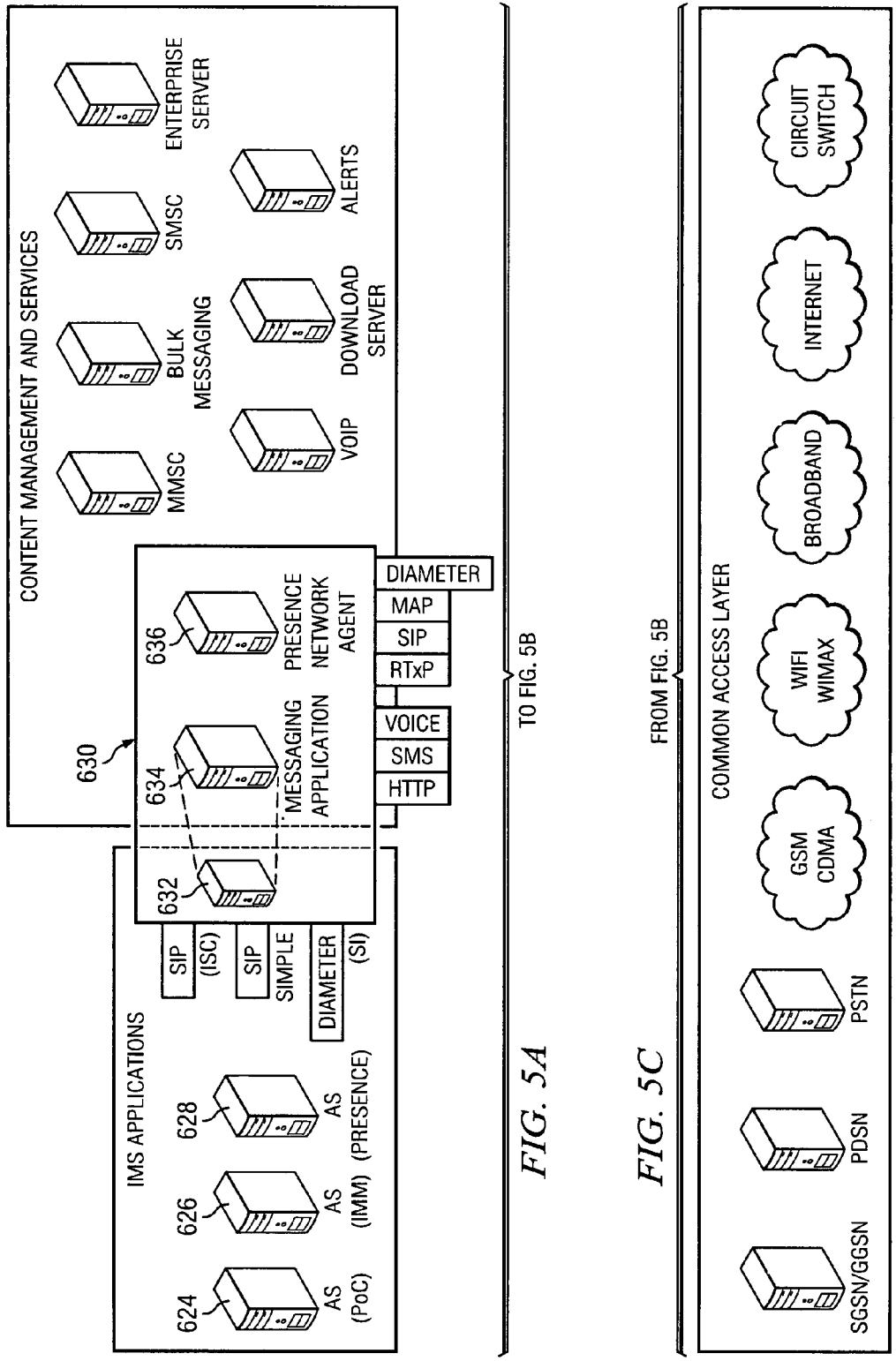
FIG. 5 depicts a block diagram of an exemplary system for interoperability in accordance with one embodiment of the present invention.
Figure 5B:
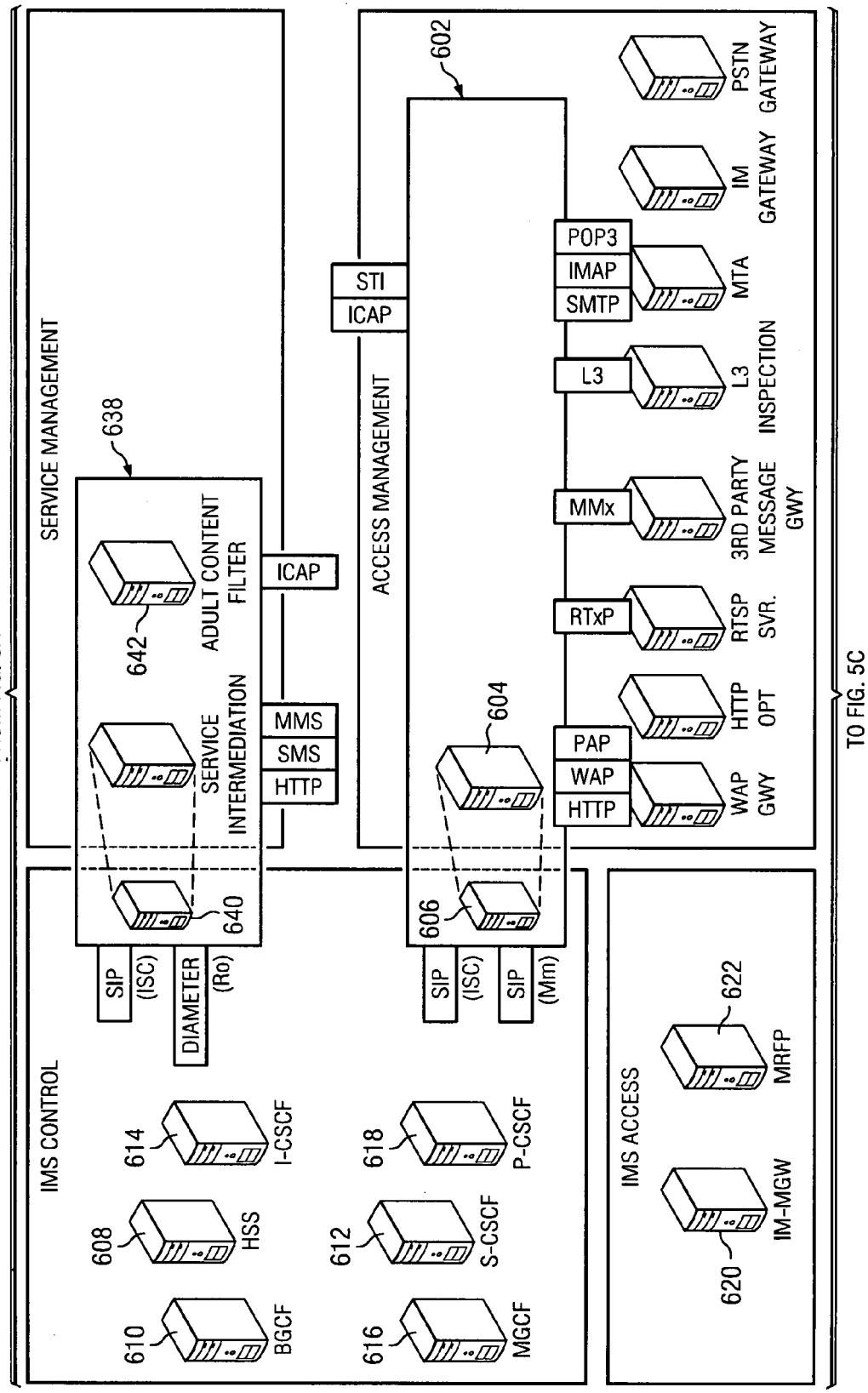

The following example of how embodiments of the present invention may be positioned relative to a reference IMS domain is provided to illustrate interoperability between an IMS domain and an IP-based services domain as depicted in FIG. 5. A system for network interoperability provides Access Management, Service Management and Content Management and Services. A Common Access Layer includes network infrastructure such as that found in a cellular network, and which may be common to various types of networks. For example, the Common Access Layer may include a GSM (Global System for Mobile Communications) cellular network, a CDMA (Code-Division Multiple Access) cellular network, a Wi-Fi® network, a WiMax network, a broadband network, a circuit-switched network or the Internet. The Common Access Layer may further include components such as SGSN (Serving GPRS Support Node)/GGSN (Gateway GPRS Support Node), PDSN (Packet Data Serving Node), and PSTN (e.g., SBC).

The network bridge 602 is used to allow interoperability between the IMS domain and the IP-based domain. The network bridge 602 comprises an access management server 604 which may appear as an I-CSCF 606 to the IMS domain, allowing non-IMS subscribers and services to appear to the IMS domain as IMS subscribers and services. It will be apparent the access management server 604 could also appear, for example, as an IBCF (Interconnection Border Control Function) or IMS-ALG (IMS Application Level Gateway) or the like. The network bridge 602 routes communications (e.g. requests and the like) from the IMS domain to the appropriate server in the IP-based domain that provides the required interoperability, performing any required translations en route. The IMS domain includes standard network elements such as HSS (Home Subscriber Server) 608, BGCF (Break out Gateway Control Function) 610, S-CSCF (Serving Call Session Control Function) 612, I-CSCF 614, MGCF (Media Gateway Control Function) 616, P-CSCF (Call Session Control Function) 618, IM-MGW (IMS Media Gateway) 620, MRFP (Multimedia Resource Function Processor) 622, PoC application server 624, IMM (Instant Multimedia Messaging) application server 626, and Presence application server 628.

Similarly, the network bridge 602 comprises a plurality of protocol interfaces to support a set of protocols which may include MMS or other protocols allowing it to act as a third party message gateway and route communications to the appropriate service in either the IMS or IP-based domain. The protocol interfaces may include without limitation SIP, ICAP, STI (Standard Transcoding Interface), HTTP, WAP, PAP, POP3, IMAP (Internet Mail Access Protocol), SMTP, MMx, L3, and RTxP.

Thus, in one embodiment a role of the network bridge 602 is to act as an access management server supporting the protocols required to interoperate with the access protocol used to access or support a service. Network bridge 602 may support multiple protocols including these utilized by network domains/technology with which network bridge 602 used, such as SIP for an IMS network domains, MM1, MM4 and MM7 used for MMS based services, etc.

In one embodiment, the application bridge 630 appears as a SIP application server 632 to the IMS domain. As such, the application bridge 630 interoperates with subscribers/services in the IMS network either directly or indirectly via the network bridge 602. The application bridge 630 supports MMS and other protocols, allowing it to deliver services to and receive requests from non-IMS users/services via MMSC (Multimedia Message Service Center) or other standard network elements. By supporting both IMS and non-IMS protocols, the application bridge 630 enables services to be developed that allow interoperability between domains, reusing existing elements/capabilities in one or both domains.

The application bridge 630 may comprise a messaging application 634 which may support, for example, HTTP, SMS, or voice. The application bridge 630 may further comprise a presence network agent 636 which is capable of acting as a source of presence information for subscribers which do not provide presence information to the IMS based presence server 628. The application bridge 630 can make use of presence information by being a Presence Watcher to determine where to route messages based on subscriber presence information.

The billing bridge 638 may appear as a SIP application server 640 to the IMS domain. The billing bridge 638 makes existing service management infrastructure, used for controlling and charging for access to value added services and content, accessible to the IMS network via the ISC or Ro interfaces. The billing bridge 638 may, for example, include an adult content filter 642 which may perform parental control functions.

Figure 6:
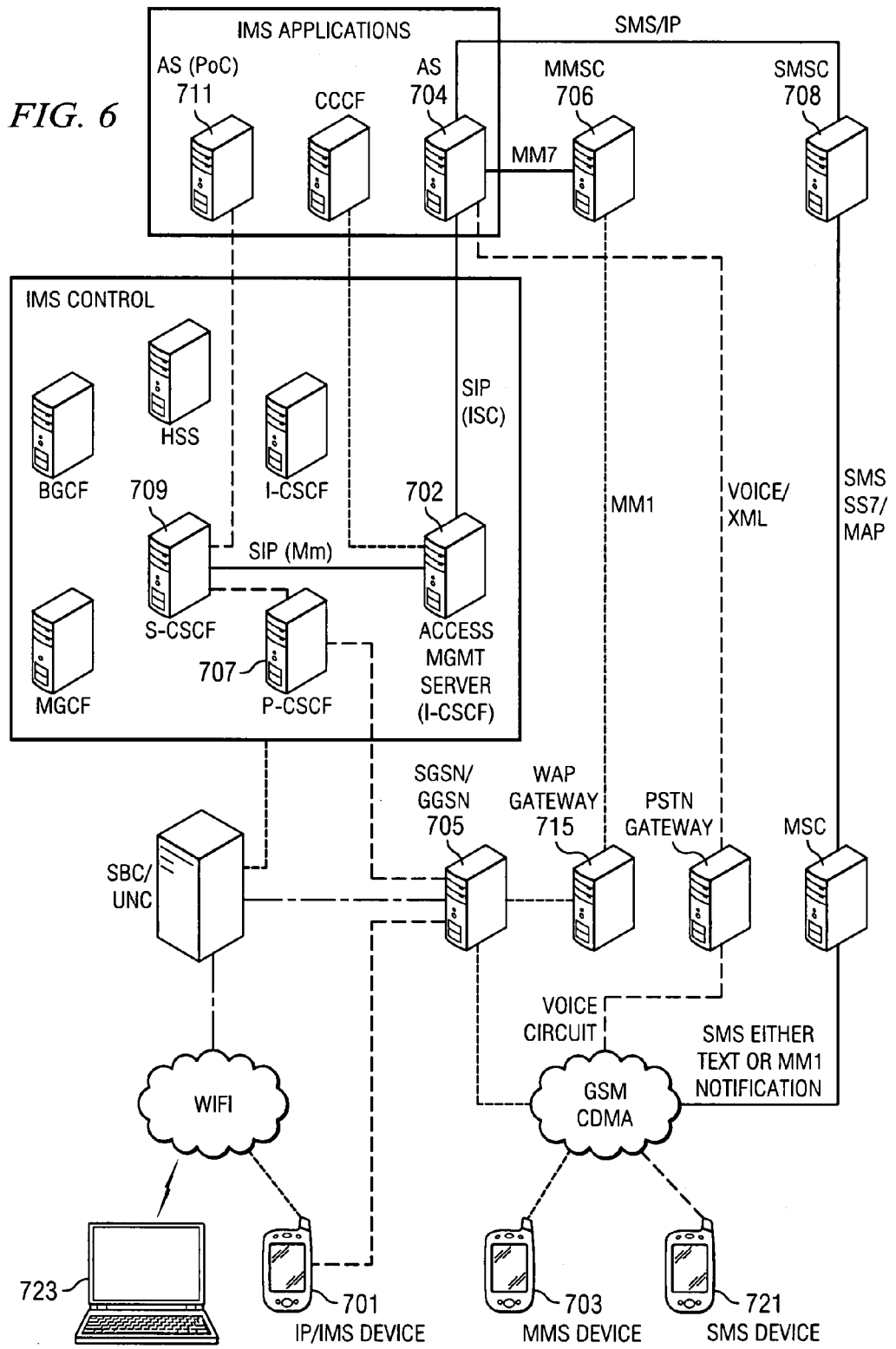
FIG. 6 depicts a process flow diagram of an exemplary system for interoperability in accordance with another embodiment of the present invention.

Another example is provided to illustrate interoperability between an IMS network and one or more non-IMS networks, as depicted in FIG. 6. The present embodiment extends the reach of pre-IMS and IP/IMS messaging services back to a subscriber's communities or legacy devices through SMS, MMS, IM, email, and voice. For example, the application suite can extend the reach of the IMS Push-to-talk over Cellular (PoC) to SMS, MMS, IM, email and voice.

In the example depicted, the network bridge comprises an access management server 702 which may appears as an I-CSCF to the IMS domain, allowing non-IMS subscribers and services to appear to the IMS domain as IMS subscribers and services. As stated above, the network bridge may also appear as, for example, an IBCF or IMSALG. The network bridge routes requests from the IMS domain to the appropriate server in the legacy domain that provides the required interoperability, performing any required translations en route.

The application bridge comprises an application server 704 which supports MMS, SMS/IP, Voice/XML, and other protocols, allowing it to deliver services to and receive requests from non-IMS users/services via MMSC 706, SMSC (Short Message Service Center) 708 and other standard network elements. By supporting both IMS and non-IMS protocols, the application bridge enables services to be developed that allow interoperability between the new and existing domains, reusing existing elements/capabilities in both domains.

In the example of FIG. 6, a client with IP/IMS device 701 is trying to communicate with a client of MMS device 703. IP/IMS device 701 sends a request to initiate a push-to-talk session through network element, which may be, for example, a SGSN/GGSN server. The request is forwarded through a proxy server (P-CSCF) 707, through service server (S-CSCF) 709 to PoC Application Server 711. In this example, the IMS architecture wants to find the PoC server for a subscriber with MMS device 703 but in the absence of this invention would be unable to find one because MMS device 703 is not an IMS and PoC enabled handset. However, Access Management Server (I-CSCF) 702, playing the role of network bridge, accepts messages (such as talk PoC invitations and talk bursts) from IMS applications as if MMS device 703 has PoC capability. The message may be forwarded using different protocols depending on the situation. For example, the message can be sent as a audio file using MMS protocol to the MNO MMSC server 706. From the MMSC standpoint, embodiments of the present invention would appear to be just another MMSC. The talk burst, appearing as a multi-media file, is then transmitted to WAP gateway 715, through SGSN/GGSN network element 705 to MMS device 703. Similarly, IP/IMS device 701 may use embodiments of the present invention to communicate with SMS device 721 or laptop 723.

The message generated by the PoC Application Server 711 can be sent directly from the Application Server 704 (playing the role of the application bridge) because AS 704 contains some or all of the network bridge functionality and can, as in this example) send the message directly. Alternatively, Application Server 704 may package the talk bursts and send them to Access Management Server (I-CSCF) 702, which routes the messages accordingly.

Figure 7:
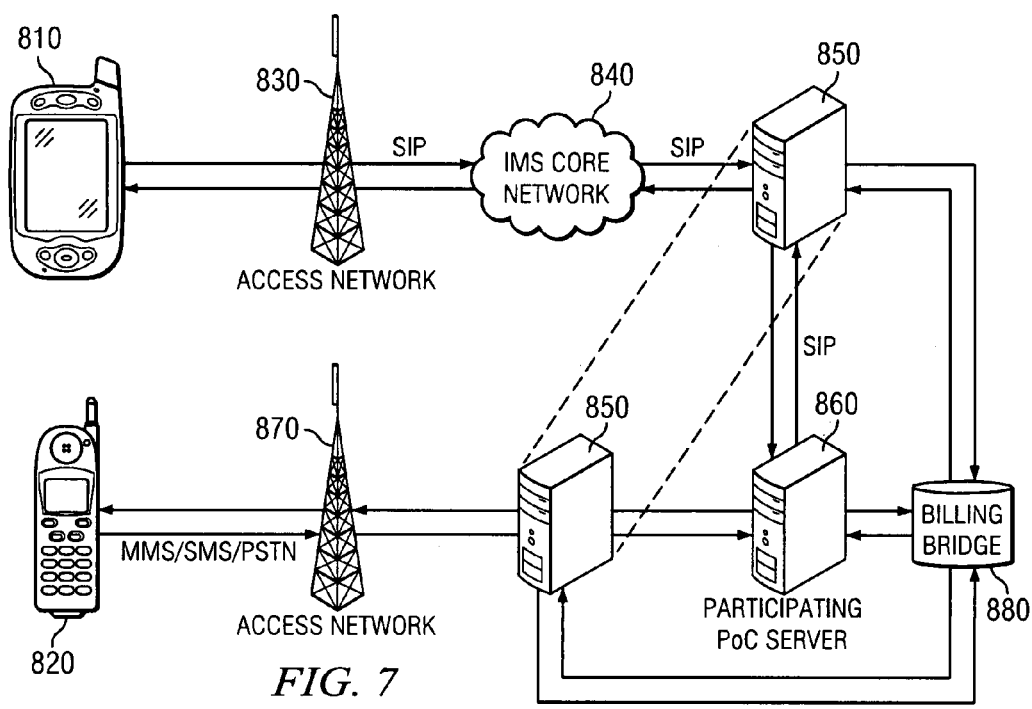
FIG. 7 depicts a block diagram for illustrating an exemplary implementation of one embodiment of the present invention.

Reference is now made to FIG. 7, which depicts a diagram for illustrating an exemplary embodiment of the present invention that enables the extension of PoC service from an IMS network to subscribers in a non-IMS network. PoC allows a mobile phone to effectively function as a walkie-talkie. A PoC user may connect via a dedicated button. No dialing phone number is needed. A message is sent and played back via the recipient's speaker. Half-duplex technology is typically provided. PoC is advantageous to end-users by providing quick connect times, cheaper cost (single handset), group talking, simplicity of use, and expanded range (as compared to a walkie-talkie). PoC is advantageous to operators by attracting new users, providing a new voice service, encouraging multiple participants to take up the service, providing efficient use of network resources, and utilizing existing cell towers, with greater distance coverage. However, PoC is traditionally available only to PoC subscribers with PoC-enabled devices.

In the example of FIG. 7, however, embodiments of the present invention may be utilized to communicate between an IMS device on an IMS network with a non-IMS enabled device on a non-IMS network. Suppose an IMS subscriber (Jane) requests a PoC session with a non-IMS subscriber (Carlos). Jane's cell phone 810 has PoC capability, while Carlos' cell phone 820 does not. Carlos' cell phone 820 is, however, capable of handling SMS messages.

A SIP message is sent from Jane's cell phone 810 via a wireless access network 830, to which Jane subscribes, and an IMS core network 840. The IMS core network 840 includes a Controlling PoC server to which Jane's request is sent. The Controlling PoC server forwards an invitation to Carlos which is routed to an access management server 850 (which includes a network bridge as discussed above). The access management server 850 forwards the request to the appropriate support server 860 (which includes the application bridge as discussed above). The support server 860 forwards an SMS message to Carlos' cell phone 820 via the access management server 850 and a wireless access network 870 to which Carlos subscribes. The message may be displayed on Carlos' phone 820, for example, as a message instructing Carlos on how to participate in the session. For example, the message may comprise an SMS message which reads as follows: "Jane wants to connect with you via push to talk. To talk dial 123." As another example, if Carlos' cell phone 820 is an MMS-capable device, the message may comprise a MMS message which announces as follows: "Jane wants to connect with you via push to talk," and Carlos may listen and reply with AMS (Audio Messaging Service). As yet another example, the message sent to Carlos may be a voice signal formatted according to a PSTN protocol.

Carlos' response, whether SMS, AMS, or other format, is sent from Carlos' cell phone 820 via Carlos' access network 870, the access management server 850, and the support server 860. The access management server 850 then formats a SIP message or RTP based Talk Burst and sends it to Jane's cell phone 810 via the access management server 850, the IMS core network 840, and Jane's access network 830.

In accordance with some embodiments, a billing bridge 880 may be used to further control access and manage charges for value-added or premium services. Although billing bridge 880 is depicted as a database, the billing bridge 880 may be implemented as software or hardware or both. The billing bridge 880 has the ability to act in either agent mode or as an intermediate proxy between the subscriber and the content as discussed above. The billing bridge 880 may include a flexible workflow engine such that an MNO (Mobile Network Operator) can define on a per service basis the charging and other policy actions required. The billing bridge 880 provides a means to extend the billing, monitoring, and provisioning services (e.g., the business logic) into the new domain. This allows the service provider to manage costs and service provisioning associated with providing services to subscribers outside the normal service domain.

Thus, it can be seen that the PoC service is effectively deployed as an application in the non-IMS domain, whereas prior to the present invention, IMS services could only be used by registered IMS subscribers. From the perspectives of the IMS subscribers and the non-IMS subscribers, it appears as if they are communicating within the same network rather than separate, different networks. The interoperability is transparent to the subscribers as well as the network operators.

Reference is now made to FIG. 8, which depicts an exemplary process flow for billing management in connection with the example of FIG. 7. As in FIG. 7, Jane (sender) is a PoC user who is attempting to reach Carlos (recipient), who is not a PoC user. In the present example, Jane is a pre-paid user, while Carlos pays for messages as he goes. In addition, Carlos' subscriber policy provides that he cannot receive messages unless he is age 18 or over, and has opted in to receiving unsolicited messages. Jane sends a message and is billed; the policy is set so that Carlos can get the message and play it. Jane is not charged for the delivery announcement.

Process flow begins at 900 with Jane's requesting a PoC session with Carlos, and therefore, a bridged service is detected. In step 902, it is determined that Jane's billing model is pre-paid PoC, and Carlos' billing model is pay-per-MMS. An inquiry is made at 904 as to whether Jane has valid funds in her account. If there are not valid funds, then Jane is notified of the charge (by way of an SMS, for example), and Jane may be given an opportunity to add funds at step 905. If there are valid funds, the delivery policy is determined in step 906. An inquiry is made at 908 as to whether Carlos has opted in to receive unsolicited messages, and whether he is age 18 or over. If the conditions are not satisfied, then a policy of no delivery is set in the application bridge at step 907. If the conditions are satisfied, then the policy is set to send a message to Carlos at step 910. Funds are decremented from Jane's account in step 912. The delivery status is determined from the application bridge in step 914. A notification of successful delivery is made, without charging Jane in step 916. Process flow ends at 918.

In accordance with embodiments of the present embodiment, non-IMS subscribers appear as if they are IMS subscribers in a remote or foreign IMS domain. The IMS network and PoC service allow for interoperability with such IMS subscribers by routing requests to the IMS domain via an I-CSCF. Embodiments of the network bridge of the present invention appears to the IMS domain as an I-CSCF, allowing the new PoC service to use its standard defined interworking capabilities but reach the application bridge providing the PoC interoperability service to the legacy non-IMS subscribers. Those skilled in the art will appreciate that the present invention is not limited to this technique, and various embodiments may act as an Application server in the role of a Participating Server in a home domain if more appropriate to the MNO, and the I-CSCF approach is just one approach to make users appear as PoC users on a different participating PoC server.

In accordance with certain embodiments of the present invention, subscriber identity management may also be provided. This provides a means to allow mobile and fixed services to interact with users of existing clients in a seamless manner by ensuring the user's identity that is presented is in context to the client and application that the recipient is using. It also allows originators to identity recipients using an address in context to the originating client and not the receiving client, which may not be known at the point of origination, used to receive the communication.

Figure 9A:
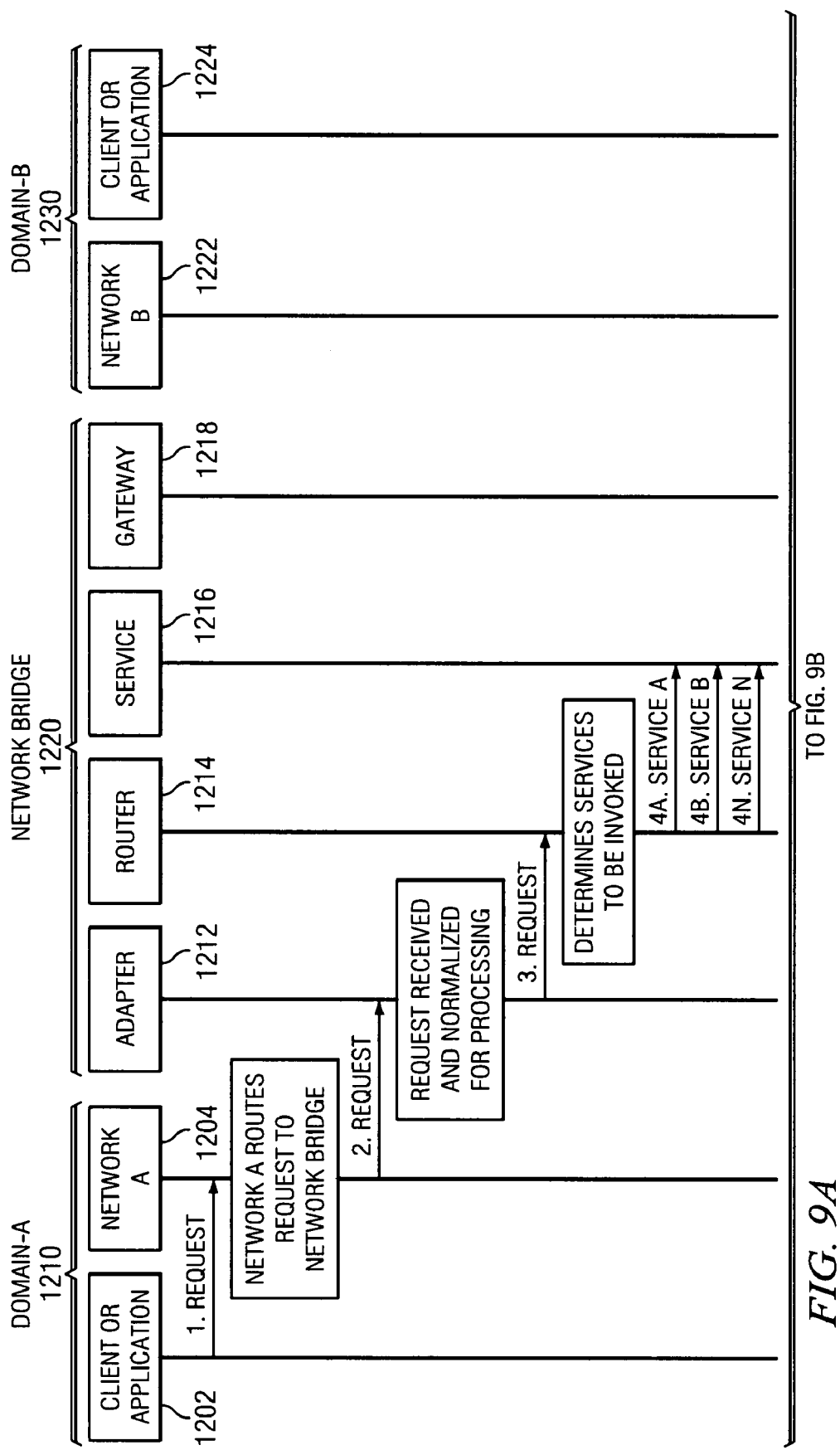
FIG. 9 represents a flow diagram of a generic flow for the network bridge.
Figure 9B:
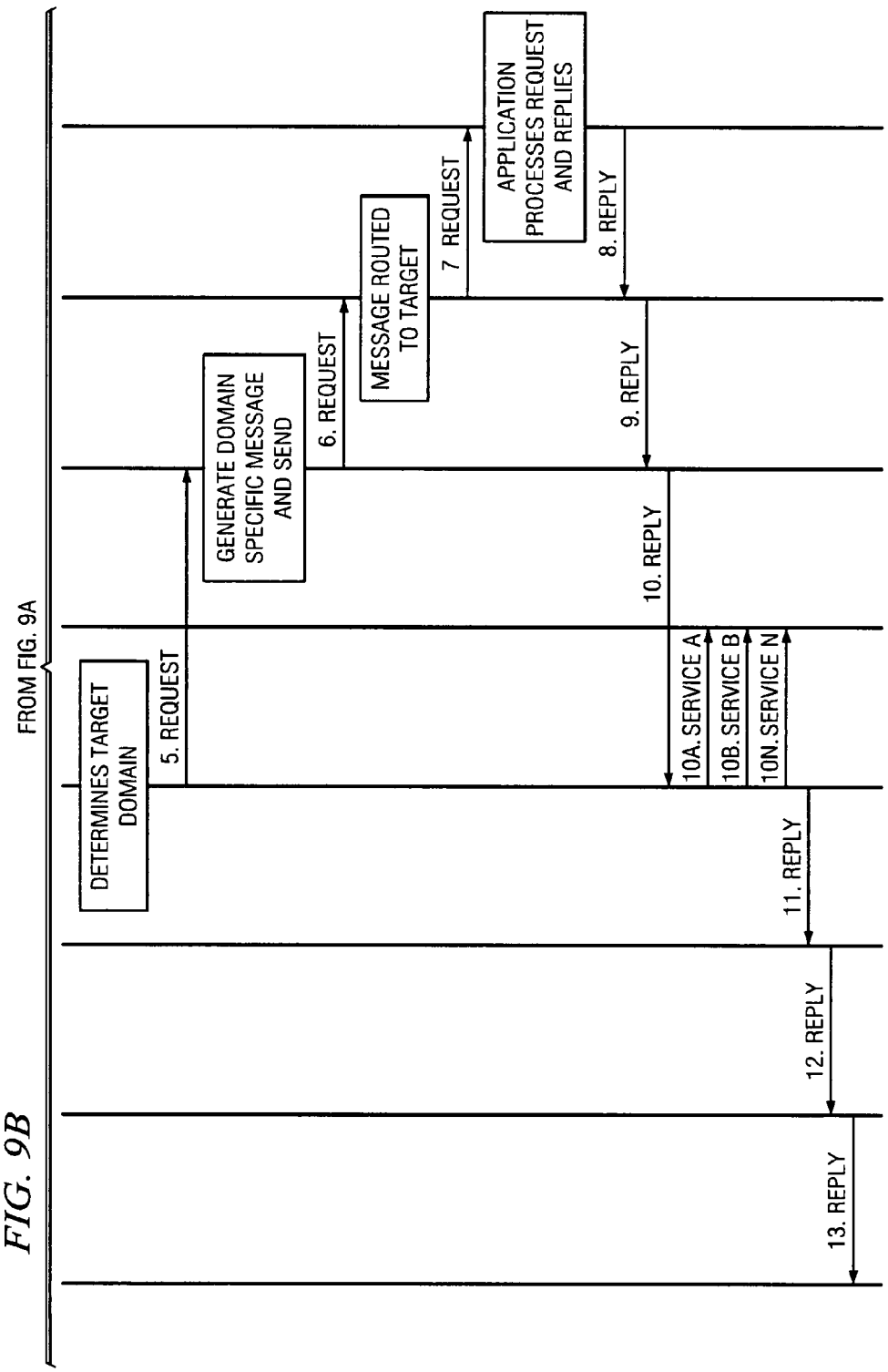

FIG. 9 represents a flow diagram of one embodiment of a generic flow for the network bridge. Embodiments of the present invention appear as standard elements to different domains, which advantageously allows requests to be routed between clients and applications in the various domains using standard equipment and procedures for that domain.

In this embodiment, a client or application 1202 in Domain A 1210 sends a request to client/application in Domain B, by initiating a request into Network A 1204. Network A 1204 routes the request to the Network Bridge 1220 as if the Network Bridge 1220 were a standard element in Domain A 1210. Once received into the Network Bridge 1220, the request is normalized by an adapter 1212 and sent to router 1214, which determines which, if any services should be applied. If one or more services (e.g., authentication, virus checking, premium content) are needed, router 1214 then causes Service 1216 to be performed to the request and then determines the target domain which in this example is Domain B 1230. In this example, the router 1214 passes the request to an appropriate gateway 1218 for Domain B 1230, and gateway 1218 generates a request valid for Domain B 1230 and initiates this into Network B 1222 for delivery to the desired recipient on Network B 1222. Advantageously, the request received by Domain B 1230 appears as if it was generated by a native client/application and Network B 1222 is able to forward the request using standard equipment and procedures. The request received by the client/application (Client B) 1224 requires no special handling or knowledge that the request was generated by Domain A 1210, and Client B 1224 is able to process the request and reply. Those skilled in the art will appreciate that in some embodiments the protocols are two-way and hence a response commonly referred to as an "in band" ACK, can come back to Client A through the gateway 1218 as shown, and a subsequent independent request from Domain B 1230 would come back via adapter 1212.

Figure 10A:
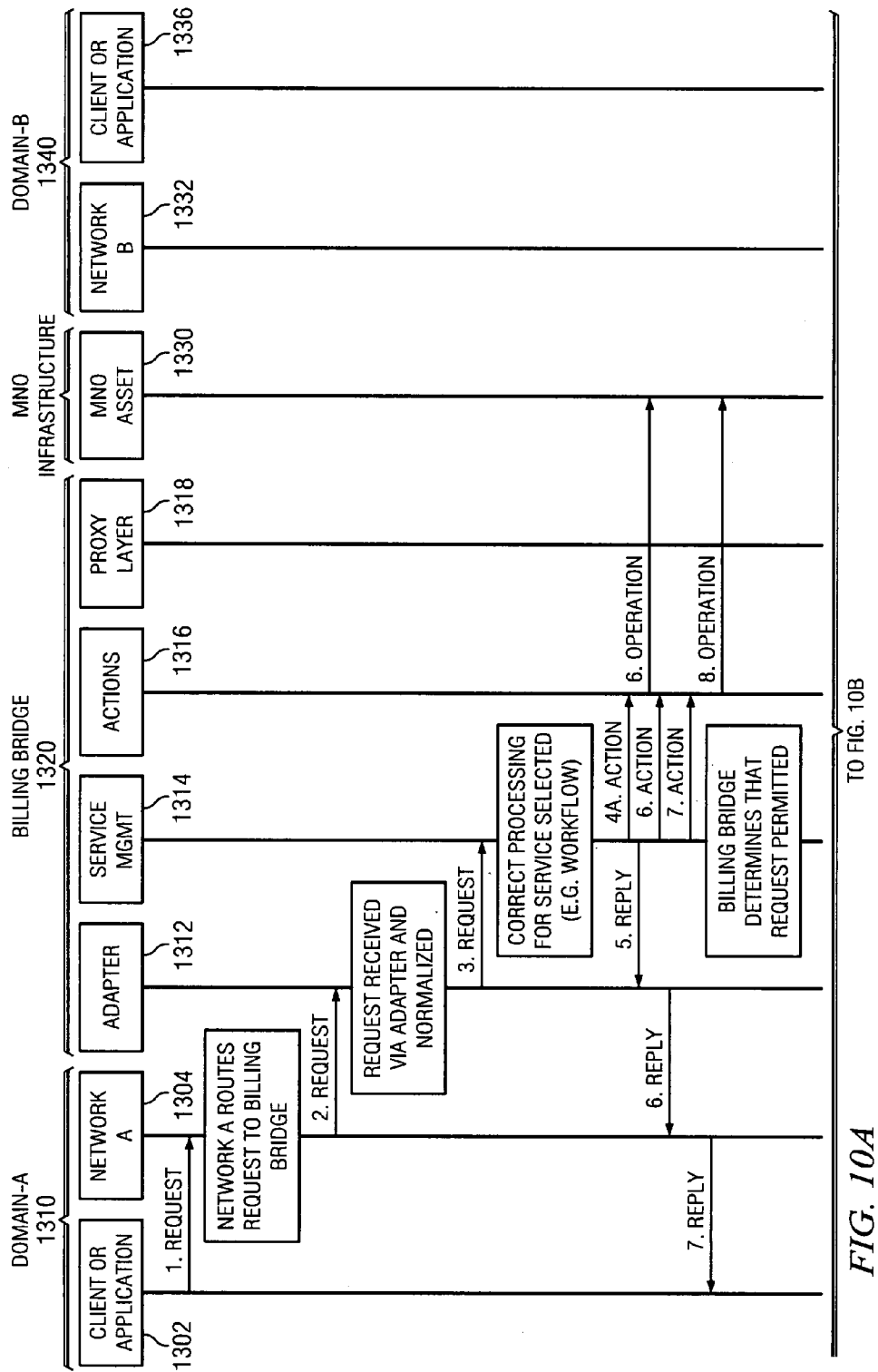
FIG. 10 illustrates a generalized flow involving the billing bridge according to one embodiment of the present invention.
Figure 10B:
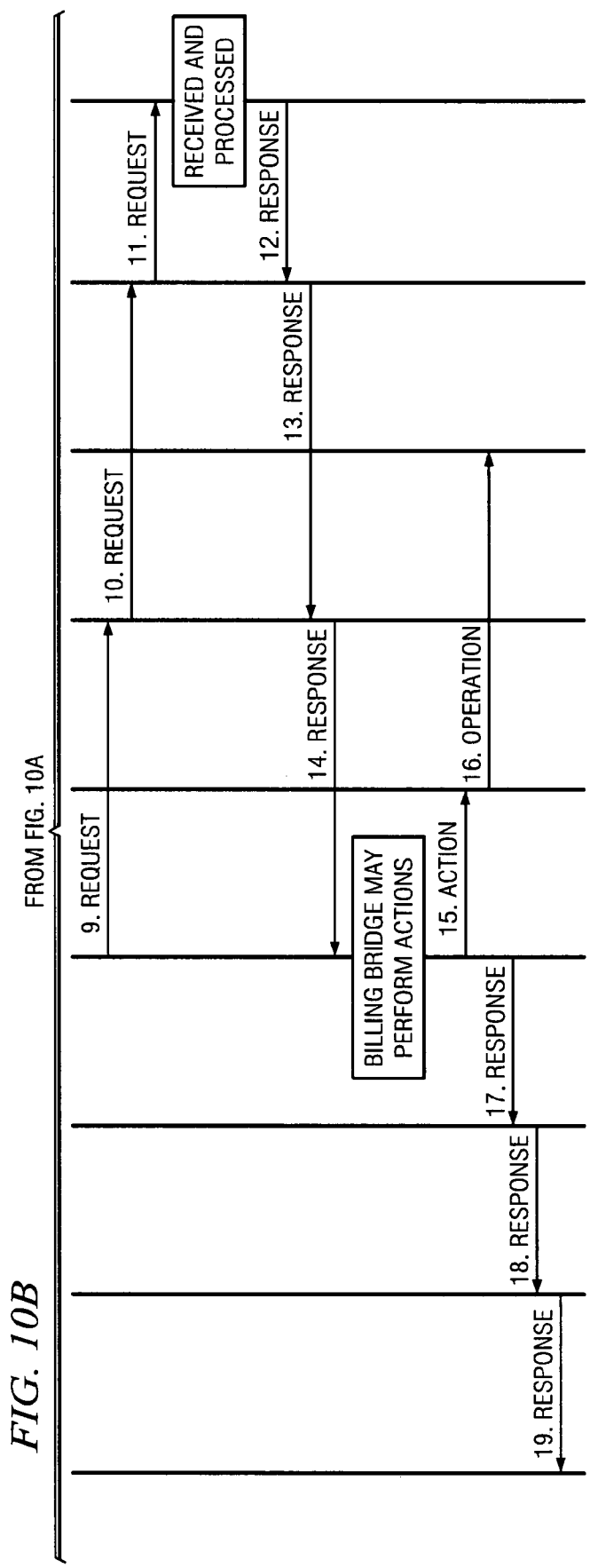

FIG. 10 illustrates an embodiment of a generalized flow involving the billing bridge according to one embodiment of the present invention. In this embodiment, the billing bridge 1320 connects to both client networks and applications/services, thus billing bridge is advantageously intermediate to both user and application/service initiated requests.

In FIG. 10, a request generated by Client A 1302 and passed to Network A 1304 in Domain A 1310 is forwarded to a Billing Bridge 1320. Adapter 1312 receives and normalizes the request and passes the request to a Service Management Application 1314 for processing. Service Management Application 1314 uses logic (e.g. a workflow as described above) to perform the billing that is independent of the protocol/application, and its multiple adapters enable it to appear as standard part of different networks (e.g., IMS, SMS, MMS, HTTP, WAP, etc.). Service Management Application 1314 determines what, if any, actions need to be applied to the request. For example, Service Management Application 1314 may determine that Client A 1302 is a pay-as-you-go client and funds must be decremented, so a reply is generated and sent notifying Client A 1302 that funds have been decremented. Service Management Application 1314 may also request more information from Client A. For example, if Service Management Application 1314 determines that Client A 1302 does not have enough funds to pay for the requested service, Service Management Application 1314 may reply and ask if Client A 1314 wants to add funds to the Client A account. Additionally, Service Management Application 1314 may determine that information or permission is needed from MNO 1330, or one or more actions generated by Service Management Application 1314 may determine that more information or permission is needed from MNO asset 1330 and thus communicates with MNO asset 1330. Once Service Management Application 1314 in Billing Bridge 1320 determines that the request should be permitted, the request is forwarded to gateway 1318, which appears like a proxy layer to network elements in Domain B 1340. Gateway 1318 forwards a request valid for Domain B 1340 to Network B 1332 in Domain B 1340 (which may or may not be the same network or domain as Domain A 1310). Depending on the applications and protocols used, there may be a response from Client B 1336 that must flow through Billing Bridge 1320 such that Service Management Application 1314 implements on or more actions (as shown) and/or contacts MNO asset 1330 (as shown) before the response is sent to Client A 1302. Alternatively, if there are no further billing actions, the request/response may bypass billing bridge 1320.

Figure 11A:
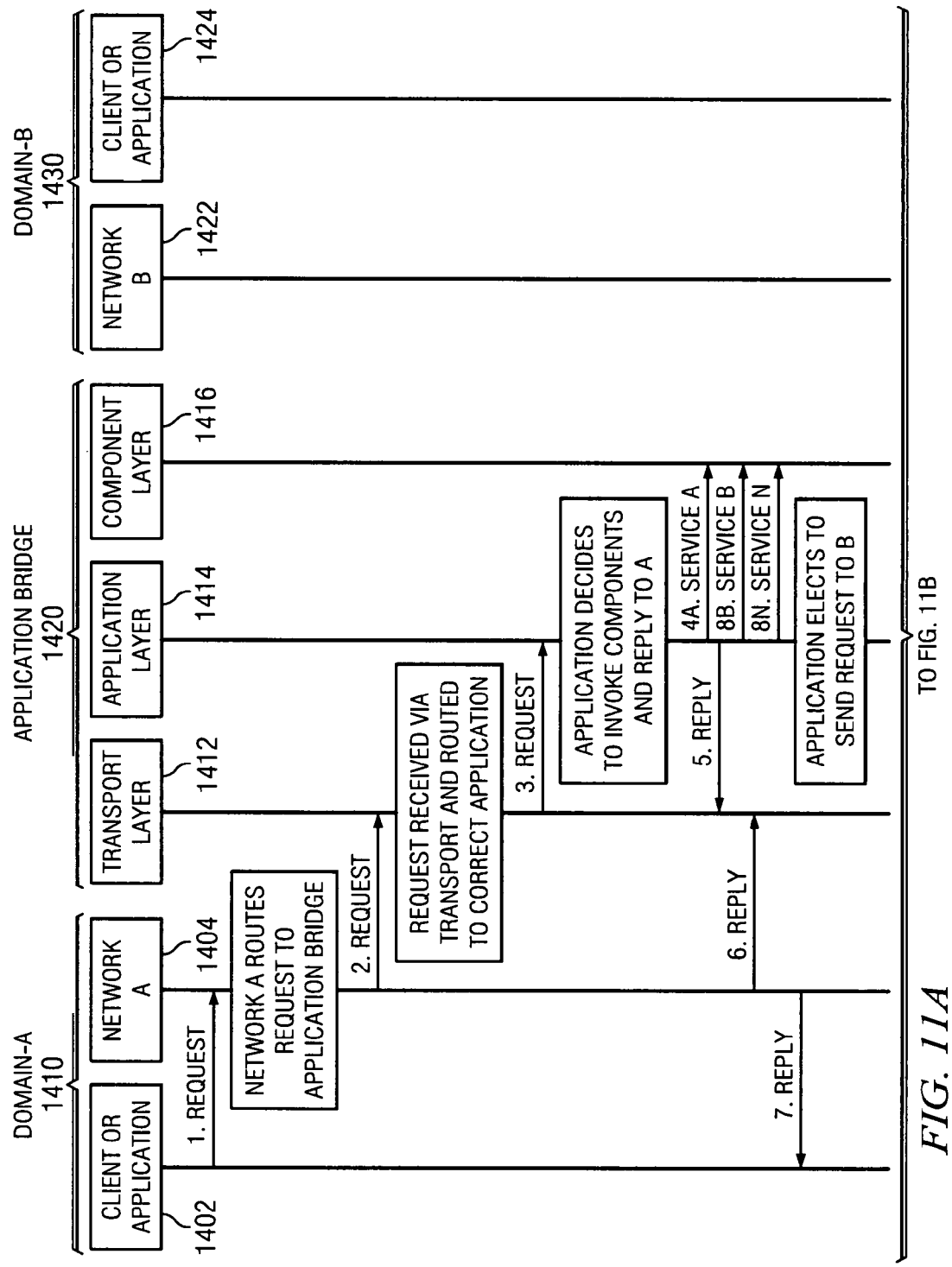
FIG. 11 is a diagram illustrating a generic processing flow that may occur at the Application Bridge in accordance with one embodiment of the present invention.
Figure 11B:
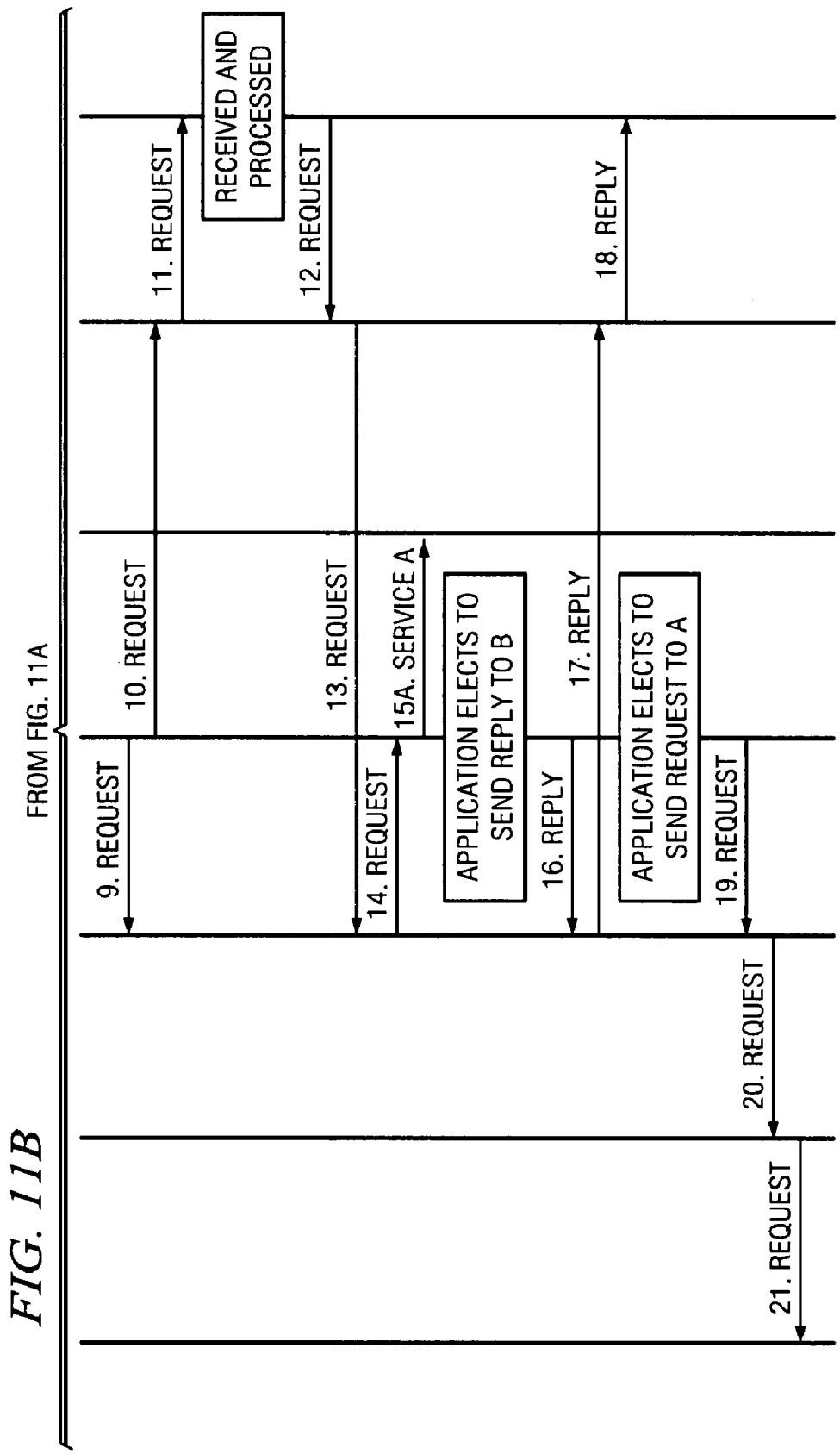

FIG. 11 is a diagram illustrating generic processing flow that may occur at the Application Bridge in accordance with one embodiment of the present invention. When Client A 1402 generates a request, Network A 1404 in Domain A 1410 routes the request to the Application Bridge 1420. The request is received by the Transport Layer 1412, where it is normalized and routed to the correct application in Application Layer 1414. Alternatively, in some embodiments, the network bridge routes the normalized request to the application layer 1414. One or more applications in Application Layer 1414 determine whether to invoke one or more components from Component Layer 1416, and may optionally reply to Client A 1402. Once the Application Layer 1414 decides to send a request to Client B 1430, a request valid for Network B 1422 is generated by the Application Layer 1414. This request is not a translated version of the request received at the application layer 1414. It is a new request generated by application layer 1414 based on rules, preferences, and policies to provide a desired application to Client B. When Network B 1422 receives the request, the Application Bridge 1420 appears as an element in Network B 1422, and the request appears as if an application/protocol within Domain B 1430 generated it, so Network B 1422 needs no new equipment or protocol to forward the request to Client B 1424. Client B 1424 receives the request and processes it according to standard protocol in Domain B 1430, and can send a request depending on how Application Bridge 1420 emulated services to Domain B 1430.

Figure 12:
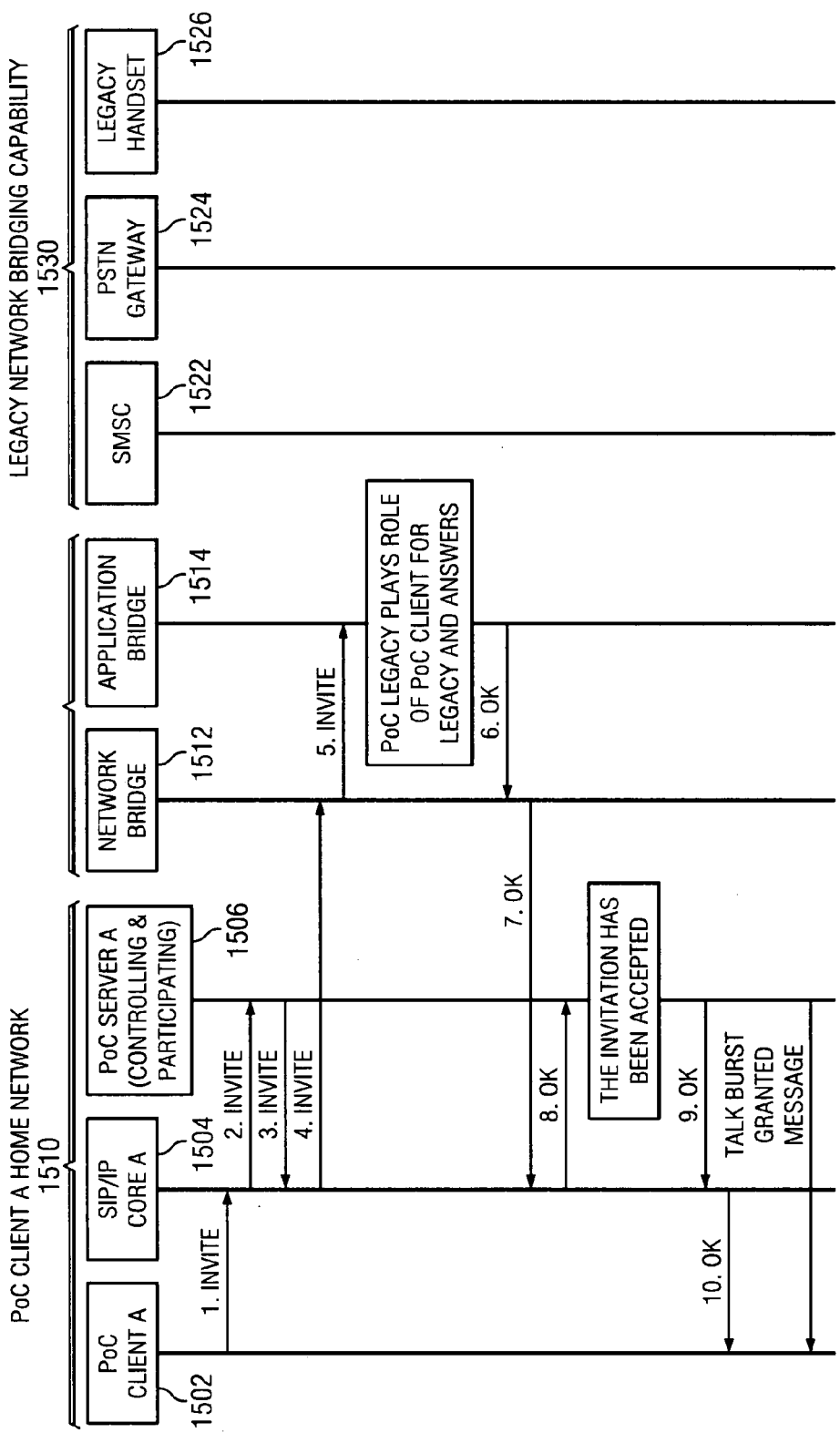
FIG. 12 illustrates one embodiment of the setup of a Push to talk Over Cellular (PoC) session to a legacy user in accordance with the present invention.

FIG. 12 represents the flow of events for one embodiment of the present invention illustrating communication between a client in an IMS domain and a non-IMS domain user 1502 when the IMS wishes to the IMS based PoC service to communicate with user who has a legacy, i.e. non IMS and non PoC, handset (1526). Initially Push-to-talk over Cellular (PoC) Client A 1502 wishes to talk with another user and sends an invite message. SIP/IP Core A 1504 processes the invite and forwards the request to PoC Server A (controlling and participating) 1506, which determines whether Client A 1502 has necessary permissions (e.g., enough funds in pre-paid account, account up-to-date, or services part of bundle of services paid for by Client A 1502) to use the requested service. Once PoC Server A 1506 determines that Client A 1502 has the necessary permissions, the Controlling PoC Server sends the appropriate invite request to the target user by sending request to SIP/IP Core A 1504, which then routes the request to Network Bridge 1512, which may appear like an I-CSCF to IMS Domain 1510. Network Bridge 1512 processes the invite request as if the target user were an IMS user and forwards the invite to application bridge 1514. Application bridge 1514 plays the role of Participating PoC server for network 1530, which includes SMSC 1522, PSTN gateway 1524, and legacy handset 1526, and answers the invite. Application Bridge 1514 answers the invite by sending appropriate PoC responses to Network Bridge 1512. Network Bridge 1512 forwards the answer in SIP format back to SIP/IP Core A 1504 located in the IMS domain 1510. SIP/IP Core A 1504 notifies Controlling PoC Server A 1506 that the invitation has been accepted. The notification that the invitation has been accepted is forwarded to the SIP/IP Core A 1504, and it is forwarded, along with the talk burst granted message to PoC Client A 1502.

Figure 13A:
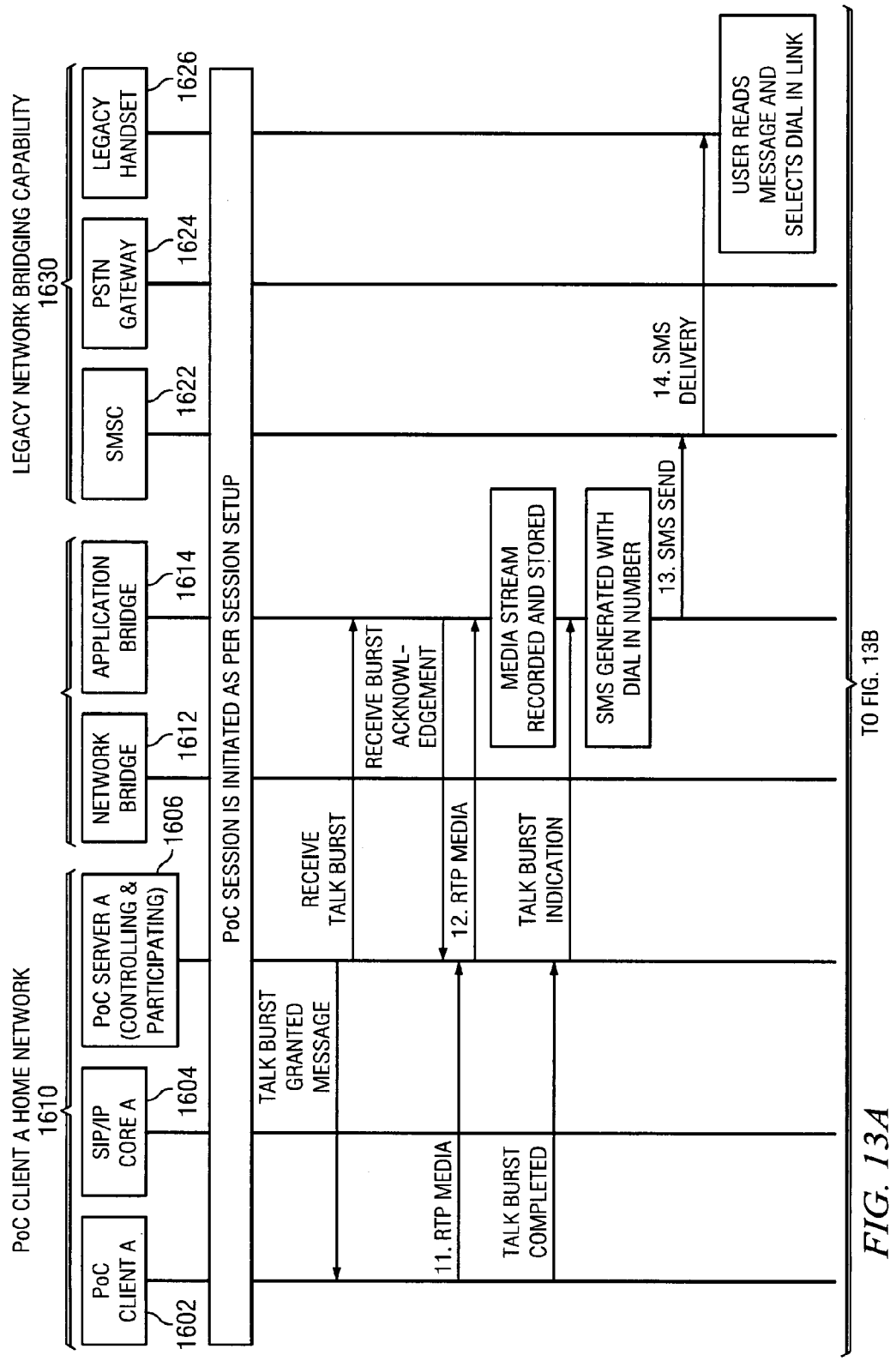
FIG. 13 describes one embodiment of a how the initial talk burst within a PoC session may be processed and how the legacy user may be notified of the PoC session and join the session, and how the initial talk burst may be delivered to the legacy user.
Figure 13B:
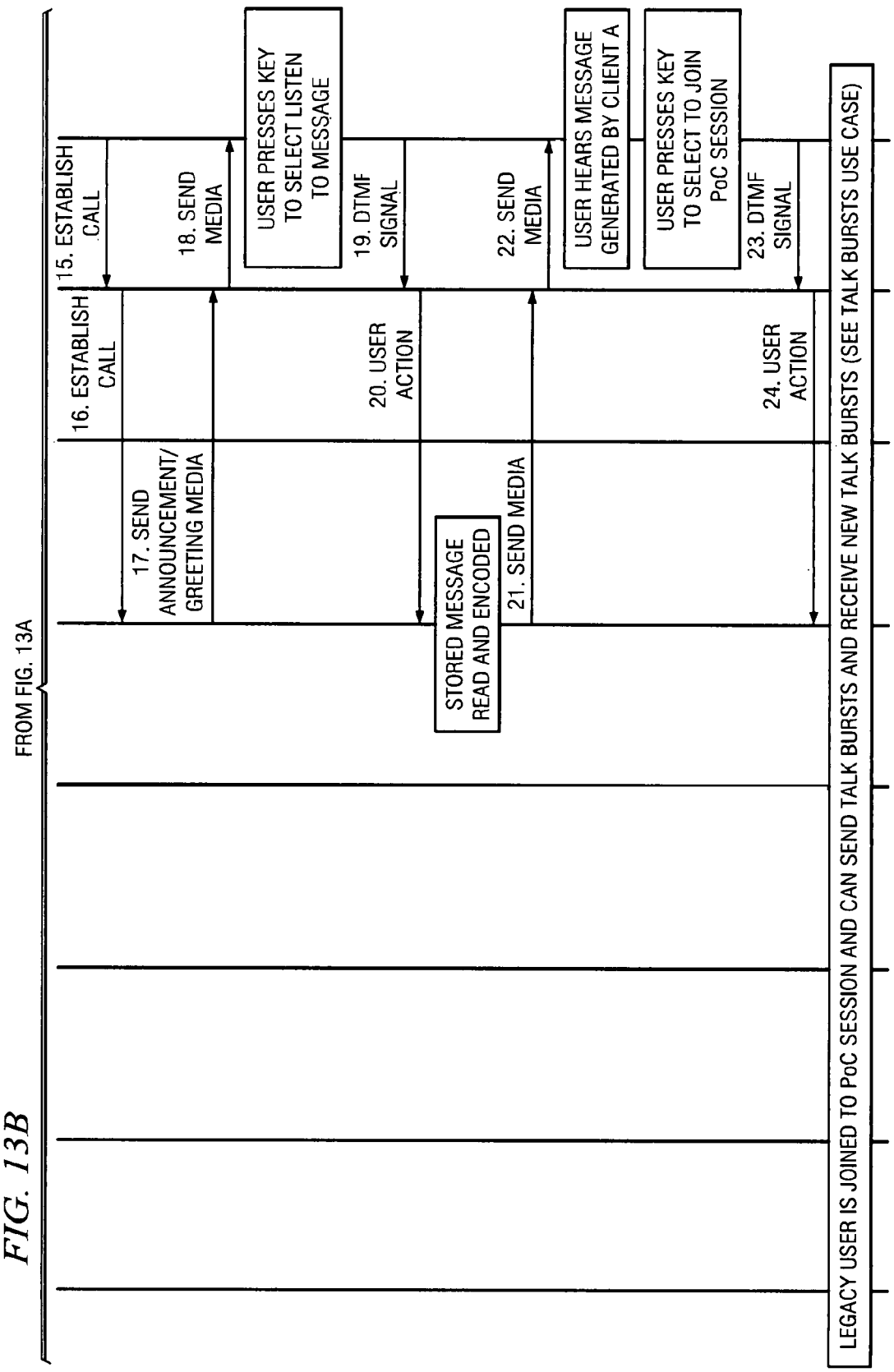
Figure 14A:
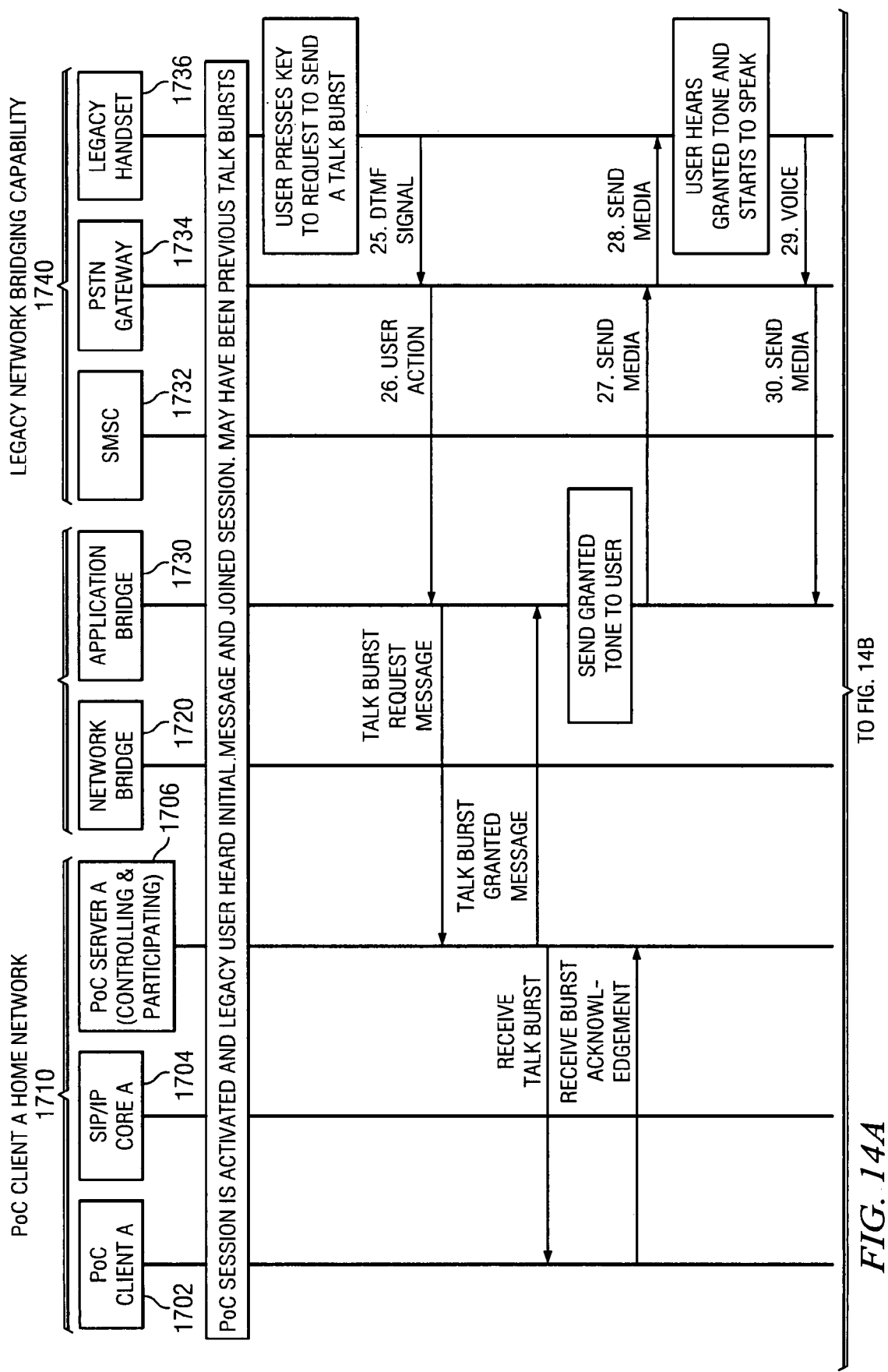
FIG. 14 is a flow diagram of one embodiment of PoC and legacy talk bursts within a PoC session after a session has been activated (such as by the flow depicted in FIG. 12 and FIG. 13) and the legacy user has heard the initial message and joined the session in accordance with one embodiment of the present invention.
Figure 14B:
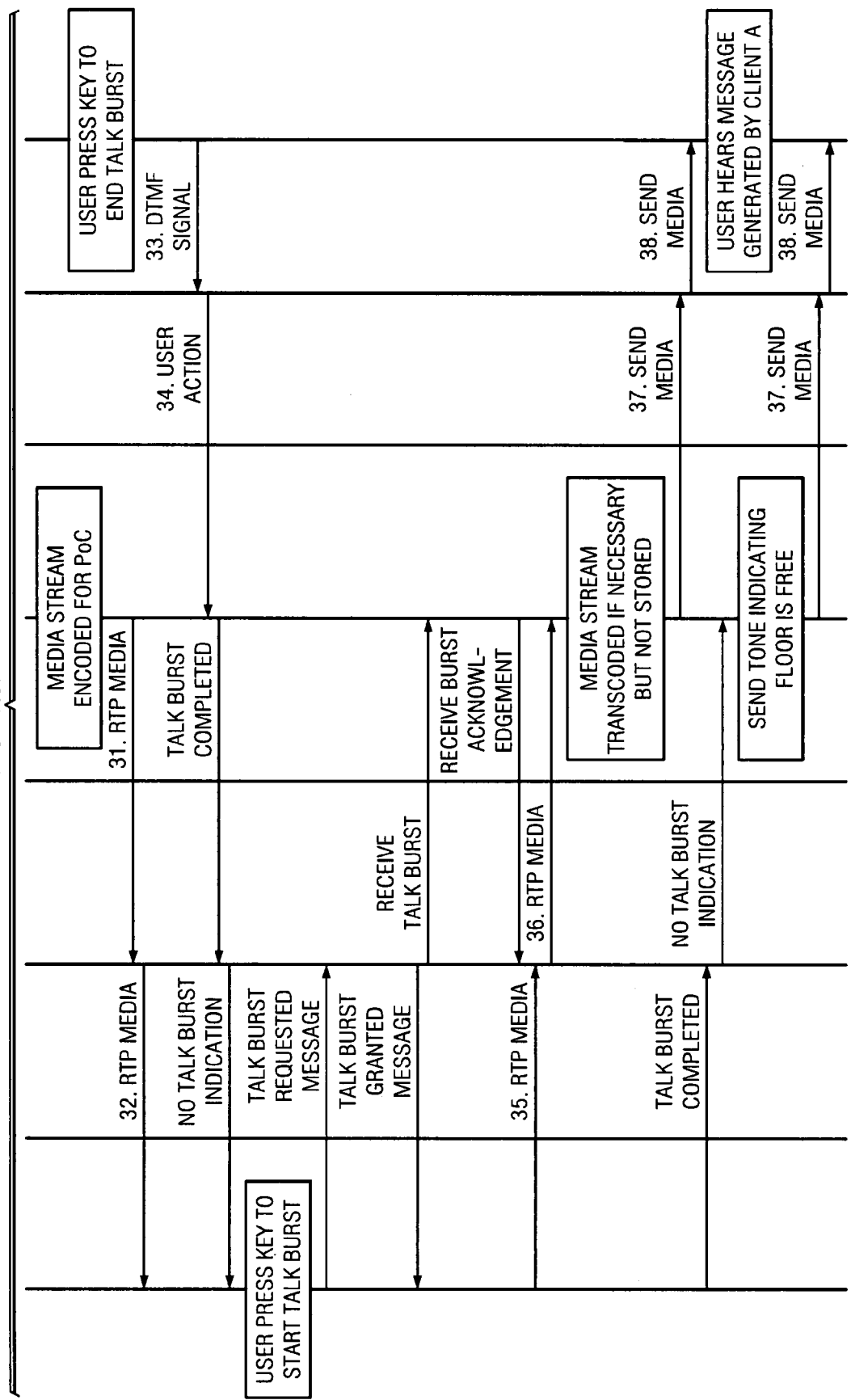
Figure 15A:
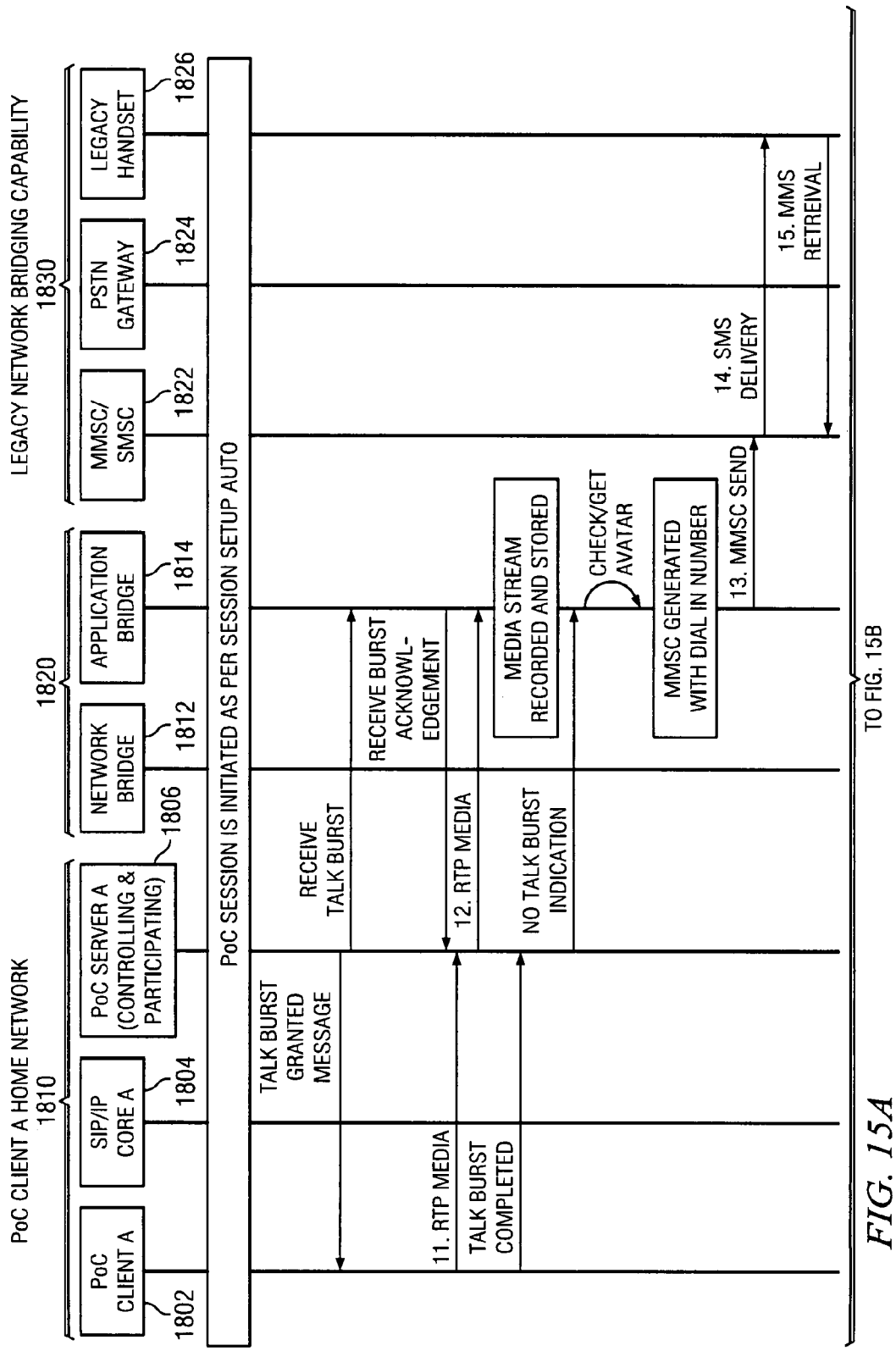
FIG. 15 represents an embodiment in which MMS may be used as the channel of communication to notify a legacy user about a PoC session, how an initial talk burst may be processed, delivered to legacy user and how legacy user can join the PoC session via a callback in accordance with one embodiment of the present invention.
Figure 15B:
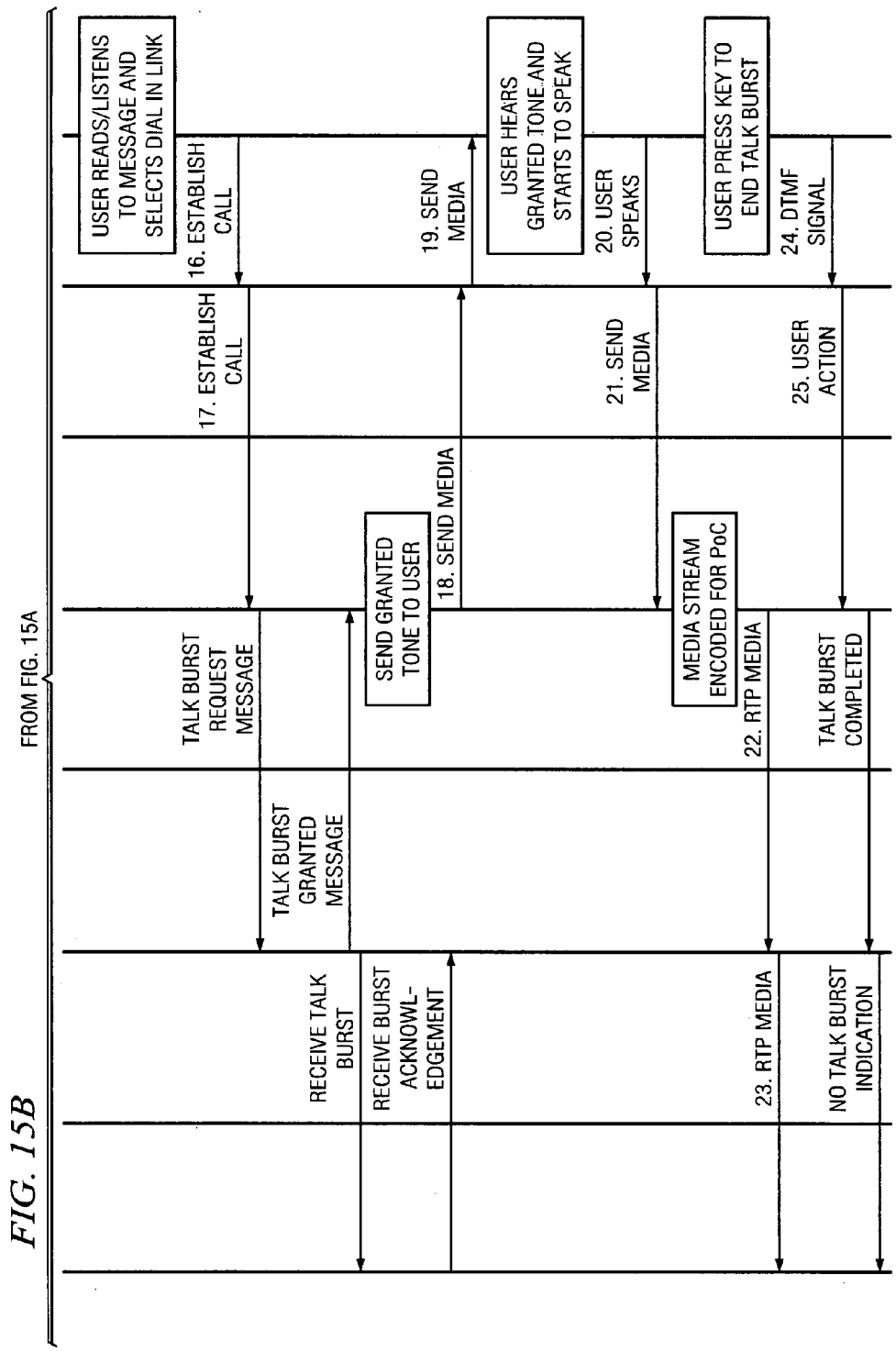
Figure 16A:
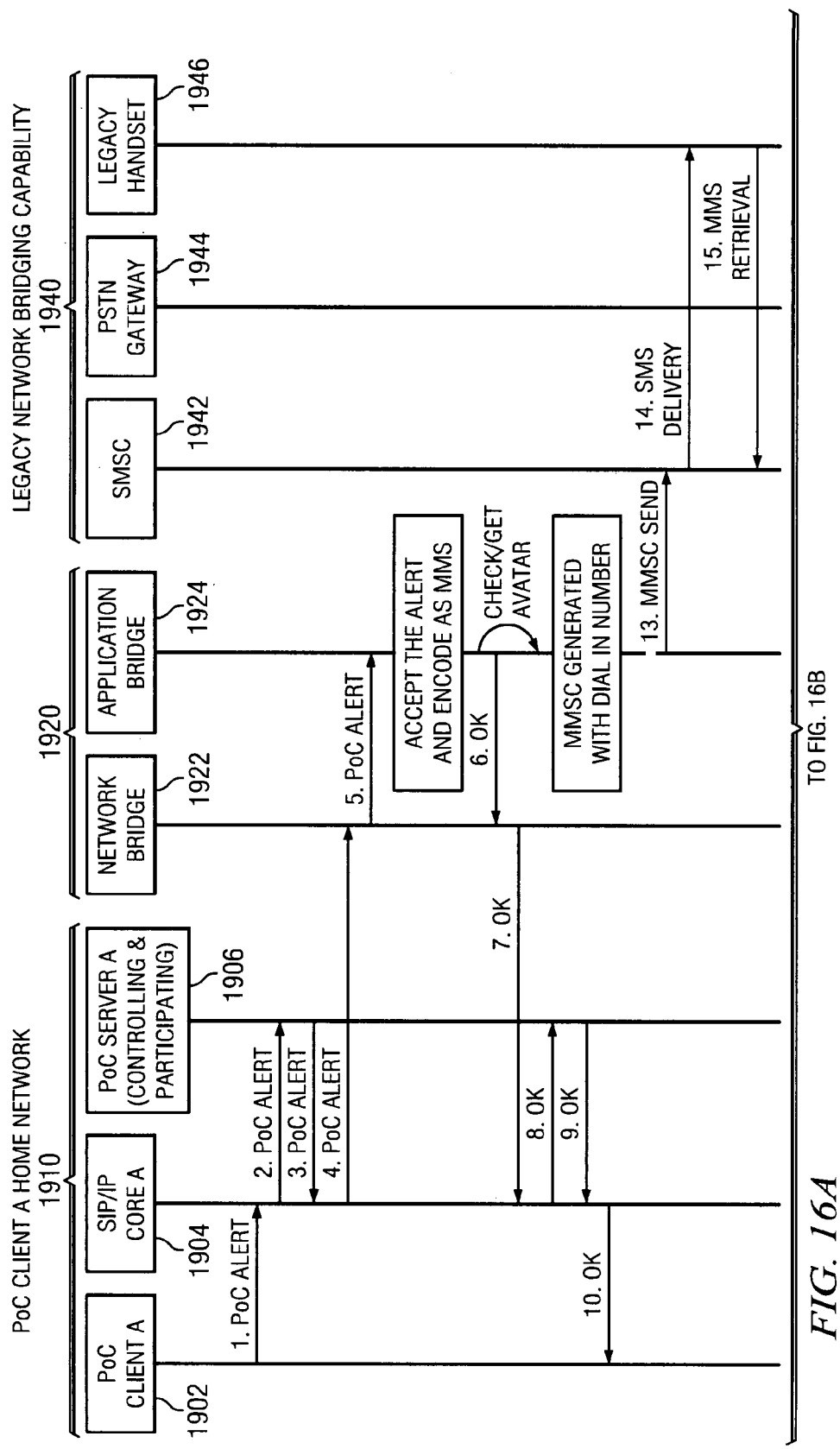
FIG. 16 is a flow diagram illustrating one embodiment for how the functionality of a PoC alert (such as in an IMS network) can be bridged with a device in a legacy domain in accordance with one embodiment of the present invention.
Figure 16B:
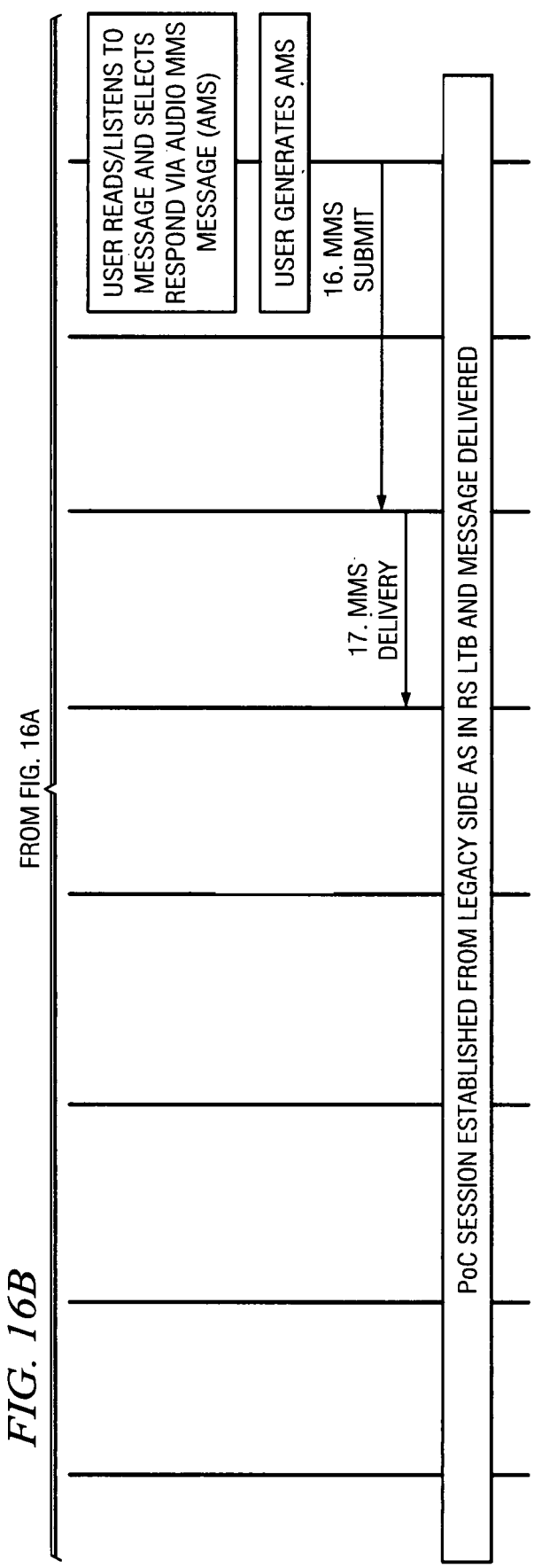
Figure 17A:
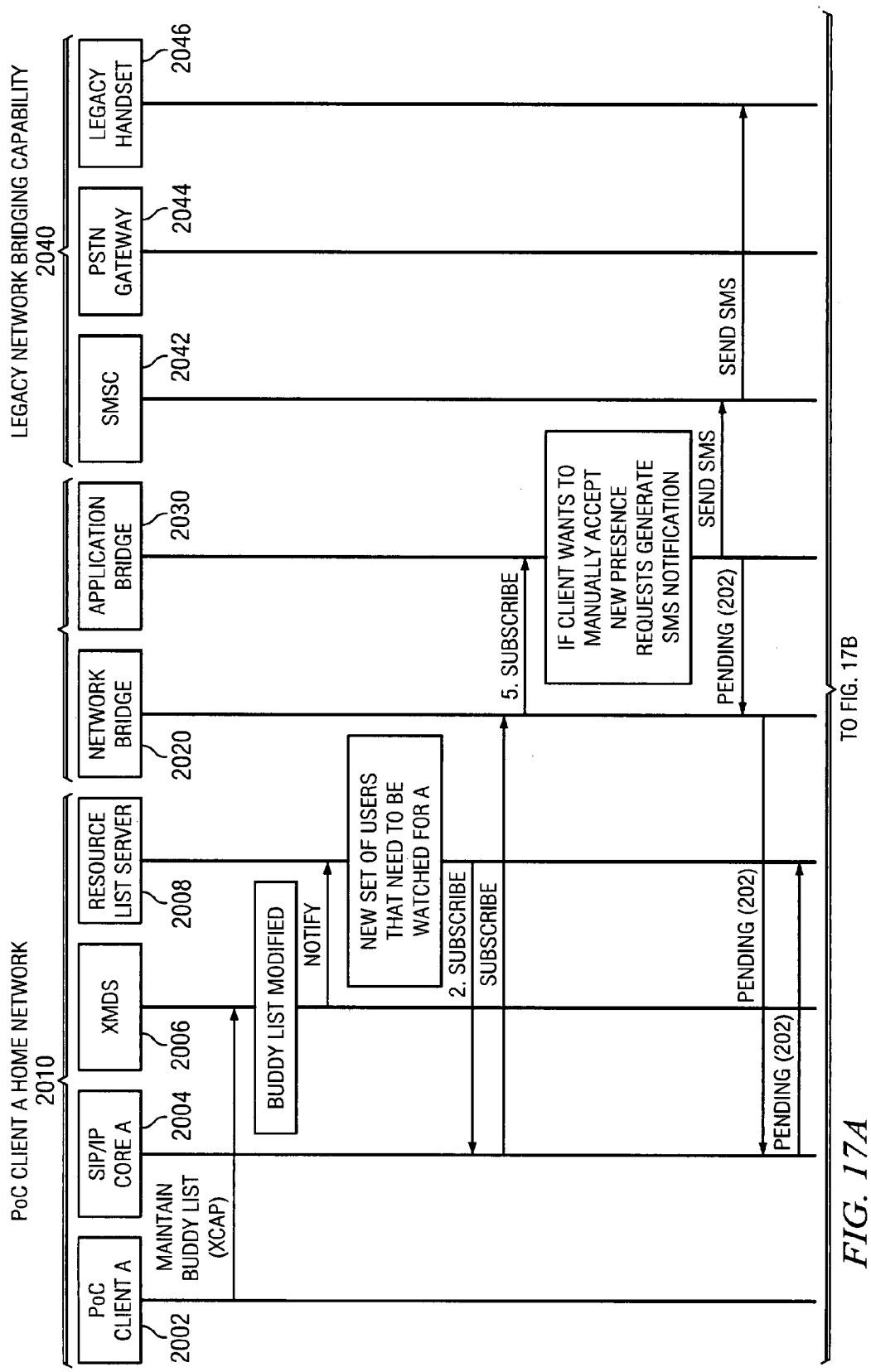
FIG. 17 is a diagram showing a PoC user adding a legacy user as a buddy in accordance with one embodiment of the present invention.

Additional embodiments scenarios illustrating interoperability are depicted in FIGS. 13-17 and 18A-E. FIG. 13 illustrates how the initial talk burst within a PoC session may be processed and how the legacy user may be notified of the PoC session via SMS, join the session and the initial talk burst delivered to the legacy user. FIG. 14 illustrates a scenario in which in a 1:1 PoC session the PoC Service is emulated to a non-PoC user with a device, enabling the legacy user to receive talk bursts and respond with talk bursts. FIG. 15 illustrates a scenario in which a 1:1 PoC session is provided with a MMS capable device, in which the initial PoC talk burst is delivered to the legacy user as audio content within the MMS used for the notification and where the user dials back in and uses this call and DTMFs to participate in the PoC session via the Application Bridge. FIG. 16 illustrates a scenario in which a PoC alert from a user in an IMS network can be bridged with a device in a legacy domain. FIG. 17 illustrates a scenario in which a PoC user adds a handset user as a buddy. A variety of other messaging protocols may be adapted in various embodiments of the present invention.

FIG. 13 depicts the flow when a user in the non-IMS domain 1630 is notified about an IMS user 1602 wishing to use the PoC services as a communication mechanism and how this non-IMS user hears the initial talk burst within this PoC Session, in which the PoC session has been set up similar to the steps shown in FIG. 12. Once the talk burst granted message has been forwarded to PoC Client A 1602, a receive talk burst message is sent by the PoC Server A 1606 to application bridge 1614, which plays the role of the PoC Client, and a receive burst acknowledgement is sent from the Application Bridge 1614 to the PoC Server A 1606. A talk burst is then sent via RTP media from PoC Client A 1602 to PoC Server A 1606, which then forwards the RTP Media to application bridge 1614, where it is recorded and stored. When the talk burst is completed, PoC Client A 1602 sends a Talk Burst Complete Indication message to PoC Server A 1606, which then notifies Application Bridge 1614. Application bridge 1614 then generates an SMS message along with a dial in number and sends the SMS message to an SMSC 1622 located in Network 1630. To SMSC 1622, Application Bridge 1614 appears as just another element in Network 1630. The SMS message is then delivered through PSTN gateway 1624 to handset 1626, and the user can read the message and associated dial-in link. The user can then establish a call through PSTN gateway 1624, which passes the message to the application bridge 1614. The application bridge 1614 then sends an announcement/greeting media through PSTN gateway 1624 to handset 1626 so that the handset user presses a key to listen to the message. In response to the message, handset user sends a DTMF signal to PSTN gateway 1624 corresponding to a user action that is read and encoded by application bridge 1614. Application bridge 1614 sends media through PSTN gateway to user of handset 1626, who can now hear the message generated by Client A 1602, and handset 1626 user can press a key to join a PoC session with Client A 1602. The DTMF signal generated by Client B is sent through PSTN gateway 1624 to Application Bridge 1614, effectively joining Client A in an IMS Domain 1610 with Client B in a non-IMS Domain 1630 in a Push-to-talk Session.

FIG. 14 is a flow diagram of PoC and talk bursts with a session after the PoC session has been activated (such as by the flow depicted in FIG. 12 and FIG. 13) and the user has heard the initial message and joined the session. User at handset 1736 presses a key to request to send a talk burst, and a DTMF signal is sent to PSTN gateway, which forwards the user action to application bridge 1730, which appears to PSTN gateway to be another element within domain 1740. The application bridge 1730 appears to the Controlling PoC server as if it were a Participating PoC server, such as exchanging messages with the Controlling PoC server to request and be granted floor control. Application bridge 1730 sends a GRANTED tone to PSTN gateway 1734, which forwards the media to user 1736. Upon hearing the tone, legacy user 1736 speaks and the voice signals are transmitted to PSTN gateway 1734, which forwards them to application bridge 1730. Application bridge 1730 encodes the media stream into a PoC format and sends the RTP media to PoC Server A 1706, which sees the application bridge 1730 as another Participating PoC Server. PoC Server A 1706 sends the RTP media to PoC Client A 1702. When Client B wants to stop talking, he or she presses a key on handset 1706, which sends a DTMF signal through PSTN gateway 1734 to application bridge 1730, and a Talk Burst Completed message is sent from application bridge 1730 through PoC Server A 1706 to PoC Client A 1702. If Client A wishes to talk, he presses the appropriate key to start a talk burst, a Talk Burst Requested message is sent to PoC Server A 1706, which then sends a Talk Burst Granted message back to PoC Client A 1702, along with a Receive talk burst message to application bridge 1730. When application bridge 1730 receives the Receive Talk Burst message, it prepares to receive the talk burst and sends a Receive burst acknowledgement to PoC Server A 1706. PoC Server A 1702 then sends talk burst via RTP Media to PoC Server A 1706, which forwards the talk bursts to application bridge 1730. Application bridge 1730 transcodes the media stream if necessary, but may or may not store the media stream. In one embodiment, the media stream is sent through PSTN gateway 1734 to handset 1736. Similarly, when PoC Client A 1702 completes a talk burst, the Talk Burst Completed message is sent to PoC Server A 1706, which sends a No Talk Burst Indication message to application bridge 1730, which sends media (such as a tone) to PSTN gateway 1734, which forwards the tone to handset 1736 notifying a handset 1736 user that PoC Client A has released the floor. After the user joins the PoC session, talk bursts are not recorded, the user can request/release floor control using DTMF tones, and the legacy user can opt to leave the conference.

FIG. 15 represents a flow chart for one embodiment of MMS notification and callback according to one embodiment of the present invention. In this diagram, a PoC session may be initiated as described in FIG. 12. A talk burst captured on RTP Media at Client A 1802 is recorded and stored in application server 1814. Subsequent bursts may also be recorded, perhaps until a user retrieves the MMS or calls back to the number in the notification, up to a predetermined limit based on the number and/or duration of messages, or as long as the call remains 1:1 (one-to-one). Optionally, an Avatar is checked for and retrieved if found. Application bridge 1814 generates an MMSC with a dial-in number, and forwards the request to the MMSC/SMSC application 1822 in network domain 1830. To the MMSC/SMSC application, the application bridge 1814 appears to be just another application/protocol in Legacy Domain 1830. The MMS contains information about the originator and the PoC session request, and may also include an Avatar. The request may be configurable to deliver the recorded talk-burst(s) to a user as an audio clip(s) within MMS, by using a reference to an album containing voice clips, or using embedded links to streaming media. The callback experience allows handset 1826 to, without limitation, listen to messages, join a PoC session, place a call, send an alert, save a message to an album, and send a message from an album. After joining a PoC session, talk bursts are not recorded, handset 1826 can, using similar techniques described in FIG. 14, request/release floor control via DTMF tones, can send talk bursts, and can leave the PoC session.

FIG. 16 is a flow chart illustrating one embodiment for how the functionality of a PoC alert (such as in an IMS network) can be bridged with a device in a domain, for example comprising MMS or SMS devices. In this embodiment, PoC Client A 1902 sends a PoC Alert to SIP/IP Core A 1904 which forwards the Alert to PoC Server A 1906. PoC Server A passes the request back to SIP/IP Core A 1904, which then forwards the PoC Alert to Network Bridge 1922, which emulates a Proxy Server (e.g., I-CSCF) making legacy user appear as if they are in a different IMS domain such that PoC Client A Home Network, PoC server, and IMS Domain A have no knowledge that Network Bridge 1922 is anything but a standard part of Domain A 1910.

Network Bridge 1922 normalizes the PoC Alert and passes the Alert to Application bridge 1924, which encodes the alert as an MMS message, checks for an Avatar and generates a request valid for Domain 1940. An MMSC generated with a dial-in number is sent through a gateway to SMSC 1942 in Domain B 1940, such that the request appears to SMSC as if it was generated from a device in Domain B 1940. The request is delivered to Handset 1946, such as by SMS delivery, and the user of Handset 1946 can read or listen to the message and respond via an audio MMS message (AMS). An MMS response is sent back to SMSC 1942 and forwarded to application bridge 1924.

FIG. 17 is a diagram showing a PoC user adding a legacy user as a buddy. In this embodiment, PoC Client A 2002 sends a request to XDMS 2006 to Maintain Client A's buddy list, and XDMS notifies the resource list server 2006 that a new set of users need to watched for Client A 2002. When the resource list server 2008 receives this notification, it sends a SUBSCRIBE request to SIP/IP Core A 2004, which sends the request to network bridge 2020, which normalizes the SUBSCRIBE request and forwards the SUBSCRIBE request to application bridge 2030. Application bridge 2030 generates a request in SMS format for Client B and forwards the request to SMSC 2042 which sends the SMS message across PSTN gateway to handset 2046. Simultaneously, application bridge 2030 sends a response to SIP/IP Core A 2004 that the request is "pending" as well as a NOTIFY request, both of which are forwarded to the resource list server 2008. Upon receipt of the PENDING and NOTIFY messages, SIP/IP Core A forwards an OK message to network bridge 2020. When legacy handset 2046 receives the SMS message sent by application bridge 2030, handset 2046 can decide to accept/decline subscription to their presence. This SMS response is sent back to application bridge 2030, and application bridge 2030 determines (if the handset accepted) to send presence information or (if the handset declined) to terminate the session.

Figure 18A:
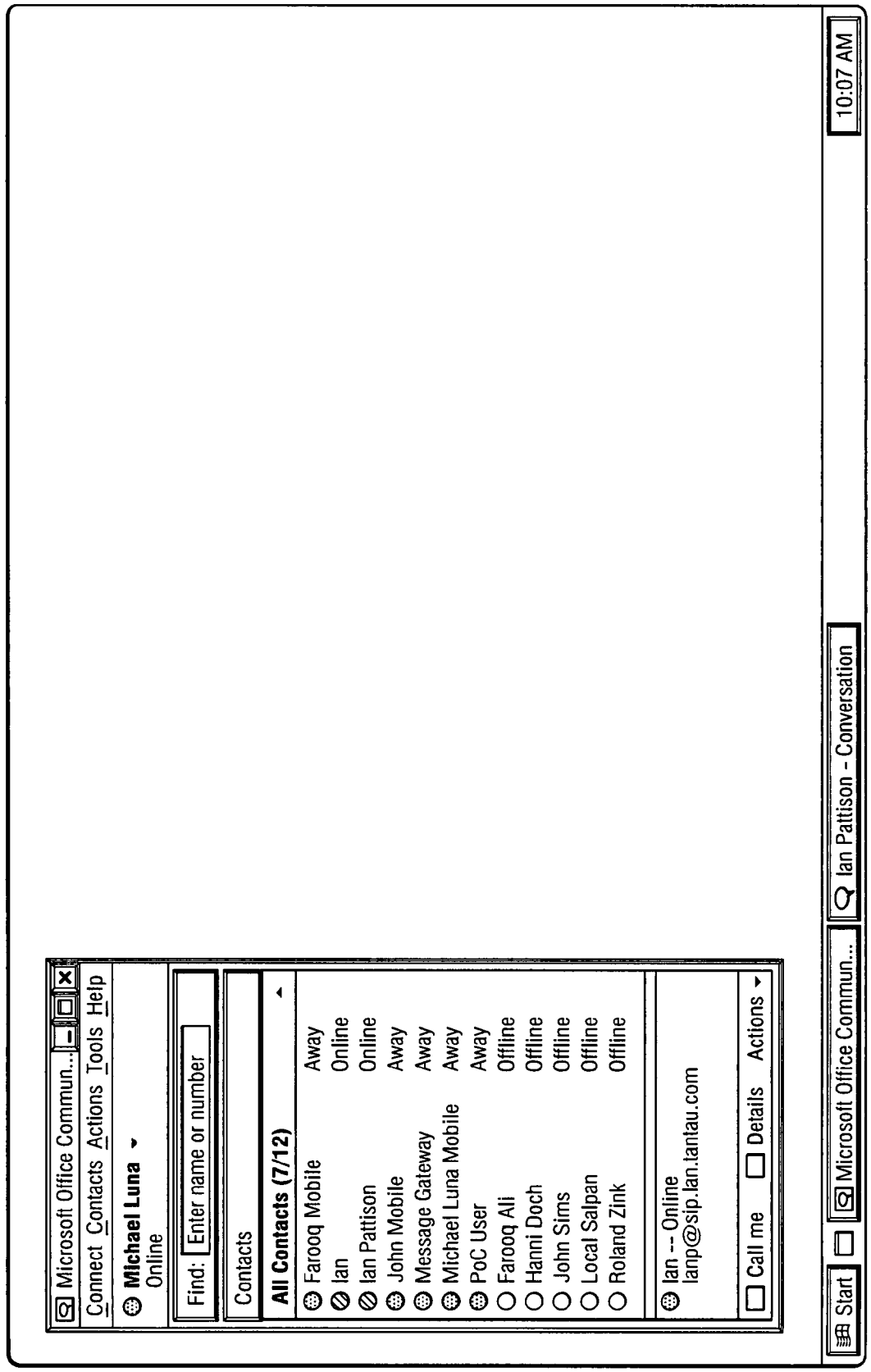
Figure 18B:
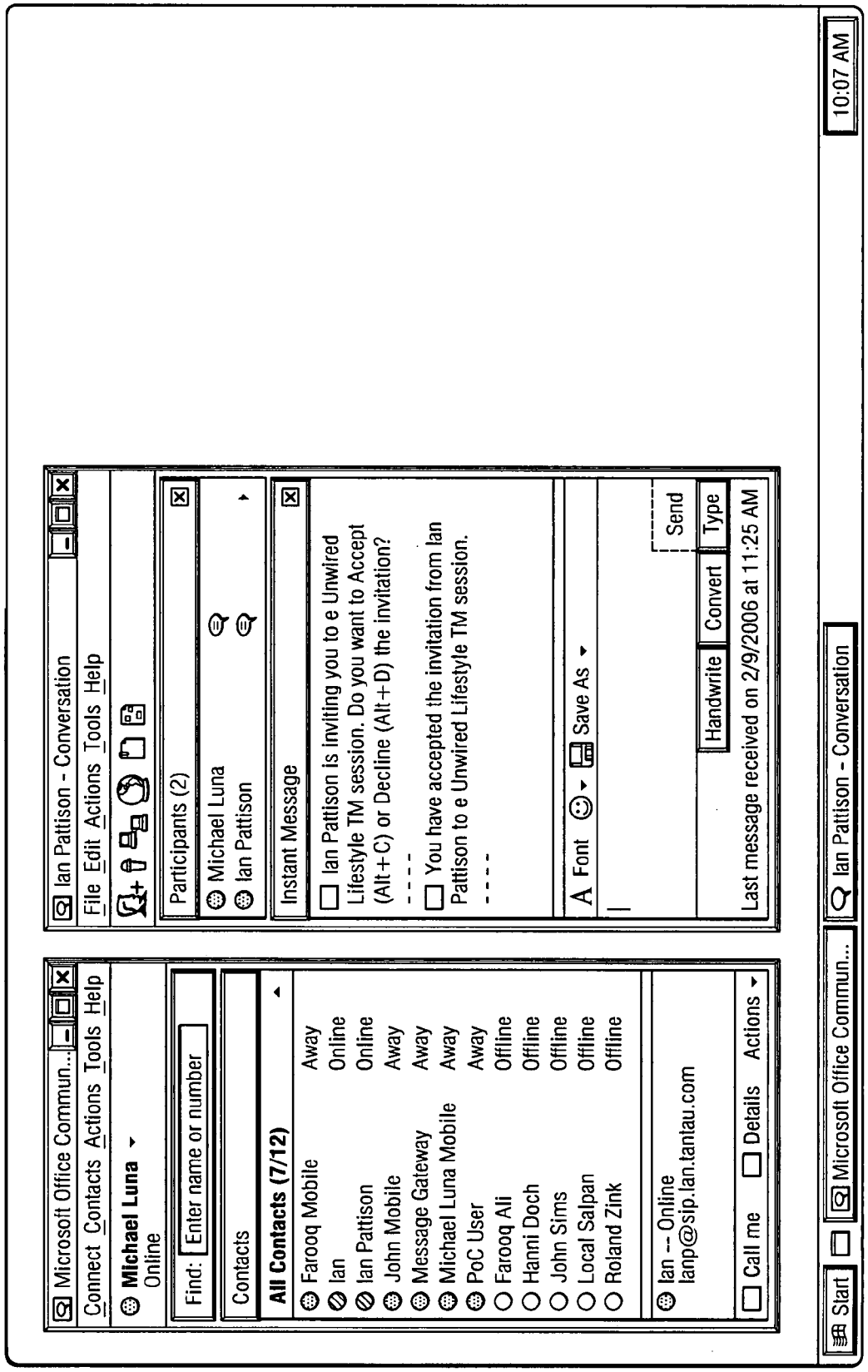
Figure 18C:
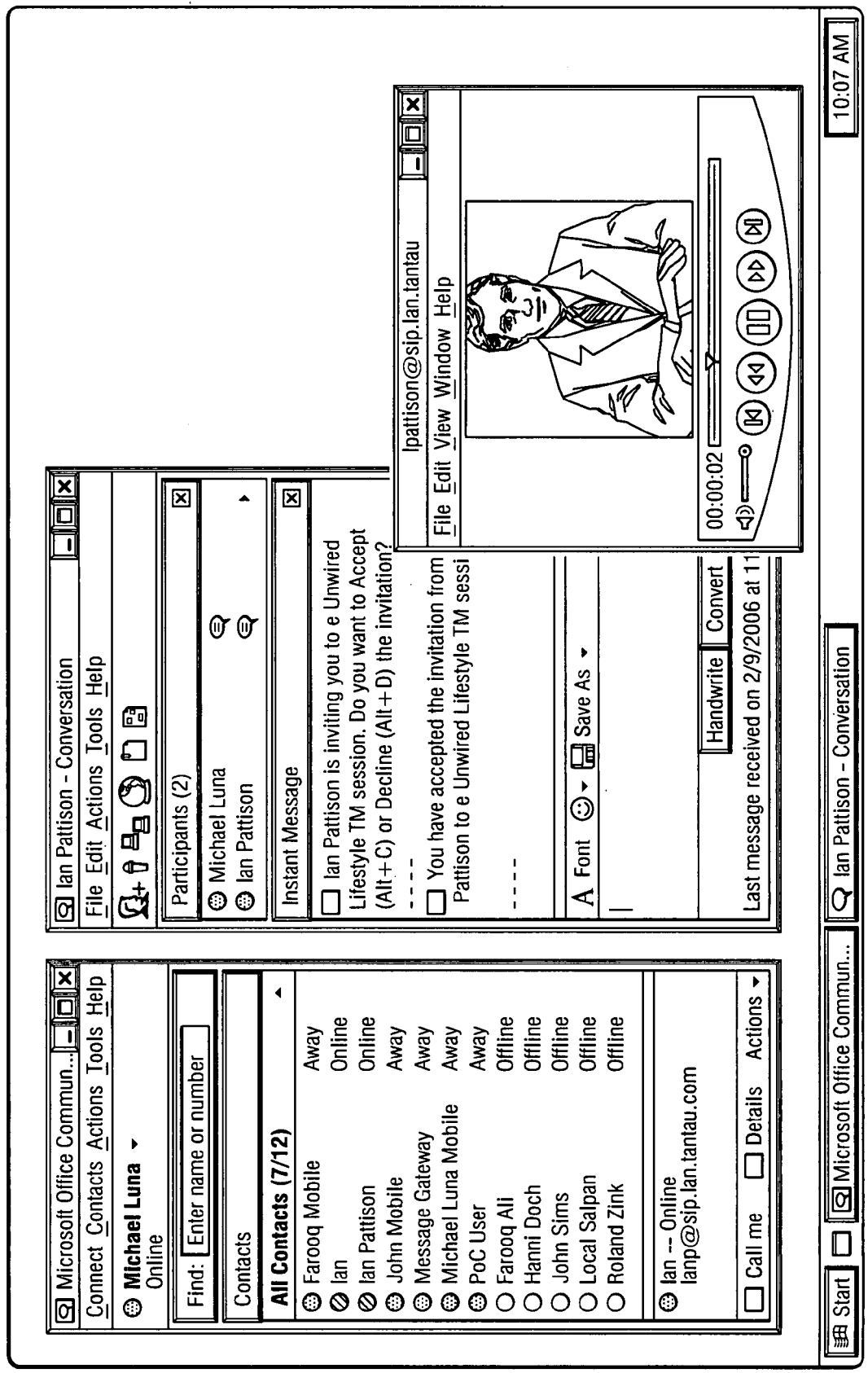

Reference is now made to FIGS. 18A, 18B, and 18C, which depict exemplary user interfaces for providing seamless interoperability between an IM-enabled client, e.g., Microsoft Office Communicator® client, and a MMS, SMS and PoC-enabled client that is able to send and receive multimedia and video. In FIG. 18A, a user interface for an IM client is depicted. A user of a mobile phone (here Ian Pattison) wishes to deliver MMS, PoC, and video to user who is currently signed into an IM client (here Michael Luna). Ian Pattison records a video message using a MMS device and sends this to Michael as if he were another MMS user. The IM user receives an invitation to a conversation, delivered as an instant message from ipattison@sip.len.tantau.com. The user interface for the conversation is shown in FIG. 18B. The IM user accepts the invitation using options provided by his domain (e.g. clicking one or more buttons.), resulting in an appropriate SIP exchange with the Application Bridge to establish the communication session. A video message is delivered to the IM user as shown in FIG. 18C.

Next, the IM user wishes to send an image (sunset.jpg) to the mobile phone user. The IM user uses normal operations from his domain to drag and drop the image into the IM window, as depicted in FIG. 18D. As a result, the image is automatically formatted and sent to the mobile phone user as an MMS message, as depicted in FIG. 18E.

It should be understood that the inventive concepts disclosed herein are capable of many other modifications. To the extent such modifications fall within the scope of the appended claims and their equivalents, they are intended to be covered by this patent. It should also be understood that the term "a" as used herein generally means "one or more" and is not intended to be construed in a singular sense. In addition, the operations described in connection with the methods of the present invention need not necessarily be executed in the sequence described, as they may be executed in a different sequence consistent with the principles of the present invention.

Thus, the above examples illustrate how users may communicate with each other without needing to know about each other's technology requirements. The senders do not need to be aware of which channel the receivers are using. Furthermore, the senders' client devices and the receivers' client devices may use different technologies and for a given user this can vary as a user switch modes of devices (e.g. phone, IM, etc). The senders' software and the receivers' software may or may not be altered. The senders and receivers do not need to subscribe to the same type of network or use the same type of service.

As a result, users of legacy networks can be seamlessly connected to users of newly developed or next-generation networks. Hence, barriers to technology are advantageously removed. True roaming and enrichment for IM clients (such as Yahoo®, Google Talk®, MSN, Office Communicator, AOL's TalkNow®, etc.) are enabled. The user experience is improved and the user community is expanded. Features of embodiments of the present invention spur adoption of new technology by extending the reach into legacy networks. Business models for new services can be driven from both the new and existing subscriber base. Usage of services is increased, leading to higher revenues for service providers.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for interoperability, the method comprising the acts of:
   providing a plurality of adapters, a plurality of gateways, and a router comprising an application bridge, a network bridge, and a billing bridge;

receiving, by an adapter of the plurality of adapters, a first communication from a user of a first network which communicates according to a first communication protocol;

normalizing, by the adapter in the plurality of adapters, the first communication into a network-independent format;

forwarding, from the adapter in the plurality of adapters to the router, the normalized first communication;

forwarding the normalized first communication from the network bridge to the application bridge and applying one or more services to the first communication independent of protocol, wherein the one or more services comprises a billing policy, virus checking, or content filtering;

generating, by the router, a second communication for a user of a second network that communicates according to the second communication protocol, wherein generation of the second communication comprises:

determining, by the router, the second communication protocol; and translating the normalized first communication into the second communication; and sending, by a gateway in the plurality of gateways, the second communication to the second network for routing to the second user.

2. The method of claim 1, wherein either the first network or second network comprises an IMS network, a Wi-Fi network, an MMS network, an SMS network, a SIP network, an XMPP network, or an IMPS network.

3. The method of claim 1, wherein the normalized first message is the basis for generating the second communication.

4. The method of claim 3, wherein the normalized first message is adapted to generate the second communication.

5. The method of claim 3, further comprising the act of transcoding the normalized first communication to generate the second communication.

6. A method for providing interoperability between networks, the method comprising the acts of:

providing a plurality of adapters, a plurality of gateways, and a router comprising an application bridge, a network bridge, and a billing bridge;

receiving, by an adapter of the plurality of adapters, a first communication from a first network which communicates according to a first protocol;

normalizing, by the adapter in the plurality of adapters, the first communication into a network-independent format;

forwarding the normalized first communication from the network bridge to the application bridge and applying one or more services to the first communication independent of protocol, wherein the one or more services comprises a billing policy, virus checking, or content filtering;

routing the normalized first communication to an application server comprising an application layer having application logic for generating an appropriate second communication, and a component layer having services with selected functionality and accessible to the application layer, wherein the application server is configured to generate the second communication for a second network which communicates according to a second protocol based on the normalized first communication, wherein generating the second communication comprises determining, by the router, the second communication protocol; and translating the normalized first communication into the second communication; receiving the second communication from the application server; and sending the second communication to a second network.

7. The method of claim 6, wherein the first communication comprises a push-to-talk service, an instant messaging service, an MMS message, or an SMS message.

8. The method of claim 6, wherein the step of generating an appropriate second communication comprises sending a response to the first network or sending multiple requests to the second network.

9. A system for interoperability between a first network communicating according to a first protocol and a second network communicating according to a second protocol, the system comprising:

an adapter configured to normalize a first communication received from the first network into a network-independent format;

a router comprising an application bridge, a network bridge, and a billing bridge; and the application bridge comprising:

an application layer comprising logic for determining a second communication valid for the second network; and a component layer comprising a plurality of components accessible to the application layer;

wherein the application bridge is configured to apply one or more services to the first communication independent of protocol, wherein the one or more services comprises a billing policy, virus checking, content filtering or delivering premium services, inspect the normalized first communication and to generate a second communication adapted for the second network using one or more components based on the normalized first communication, wherein generating the second communication comprises determining, by the router, the second communication protocol; and translating the normalized first communication into the second communication.

10. The system of claim 9, wherein the application bridge comprises a transport layer configured to receive messages from the first network and operable to send the second communication to the second network.

11. The system of claim 9, further comprising a network bridge configured to receive the first communication from the first network and operable to send the second communication to the second network, the network bridge comprising:

an adapter configured to receive the first communication from the first network and normalize the first communication;

a router configured for receiving the normalized first communication from the adapter, and forwarding the second communication to the second network, wherein the network bridge is operable to apply one or more services to the normalized first communication.

12. The system of claim 9, wherein the network bridge is operable to store the first communication received from the adapters in a queue and further operable to store the normalized first communications for the application layer in a queue.

13. The system of claim 9, wherein the application layer logic is operable to receive the first communication in email format, normalize the communication into a network-independent format, and generate a second communication in MMS format.

14. The system of claim 9, wherein the application layer logic is operable to receive the first communication in MMS format, normalize the communication into a network-independent format, and generate a second communication in email format.

15. The system of claim 9, wherein the application layer logic is operable to upload and download images, deliver PoC messages, compose an album, view an album, deliver MMS with audio content, or deliver audio content over established voice calls.

16. The system of claim 9, wherein the network bridge further comprises a plurality of protocol gateways, each configured to route the second communication to an appropriate server in the legacy network.

17. The system of claim 9, further comprising a billing bridge communicably coupled to the network bridge, wherein the billing bridge is configured to control access to content and services.

18. The system of claim 17, wherein the billing bridge comprises a workflow application configured to generate one or more actions to determine a billing policy.

19. A system comprising a machine-readable medium having stored thereon a set of instructions operable for causing the computer to execute the following:

receive a first communication from a first network which communicates according to a first communication protocol;

normalize the first communication into a network-independent format;

apply one or more services to the first communication independent of protocol, wherein the one or more services comprises a billing policy, virus checking, or content filtering;

generate a second communication for a second network that communicates according to a second communication protocol based on the normalized first communication, wherein generating the second communication comprises determining, by a router, the second communication protocol; and translating the normalized first communication into the second communication; and send the second communication to the second network.

20. The system of claim 19, further comprising
selecting a channel of communication; and
selecting an identity, from a plurality of identities, of a recipient subscriber of the second network.

* * * * *